US010207309B2

(12) United States Patent
Magnuson

(10) Patent No.: US 10,207,309 B2
(45) Date of Patent: Feb. 19, 2019

(54) APPARATUS AND METHOD FOR MOVING A WORKPIECE

(71) Applicant: Peddinghaus Corporation, Bradley, IL (US)

(72) Inventor: James Magnuson, Kankakee, IL (US)

(73) Assignee: Peddinghaus Corporation, Bradley, IL (US)

(*) Notice: Subject to any disclaimer, the term of this patent is extended or adjusted under 35 U.S.C. 154(b) by 0 days.

(21) Appl. No.: 15/776,711

(22) PCT Filed: Mar. 28, 2016

(86) PCT No.: PCT/US2016/024427
§ 371 (c)(1),
(2) Date: May 16, 2018

(87) PCT Pub. No.: WO2017/171701
PCT Pub. Date: Oct. 5, 2017

(65) Prior Publication Data
US 2018/0339332 A1    Nov. 29, 2018

(51) Int. Cl.
*B21D 43/13*    (2006.01)
*B21D 43/05*    (2006.01)
(Continued)

(52) U.S. Cl.
CPC ............ *B21D 43/13* (2013.01); *B21D 43/05* (2013.01); *B23Q 7/001* (2013.01); *B23Q 7/03* (2013.01);
(Continued)

(58) Field of Classification Search
CPC ...................................................... B21D 43/13
(Continued)

(56) References Cited

U.S. PATENT DOCUMENTS 3,590,987 A * 7/1971 Evans ................ B65G 25/02
                                                                198/751
3,651,955 A    3/1972 Shkredka
(Continued)

OTHER PUBLICATIONS

International Search Report and Written Opinion for corresponding PCT Application No. PCT/US2016/024427 dated Jun. 10, 2016.

*Primary Examiner* — Gene O Crawford
*Assistant Examiner* — Lester Rushin, III
(74) *Attorney, Agent, or Firm* — Wood, Phillips, Katz, Clark & Mortimer

(57) ABSTRACT

A transfer apparatus (104) for transferring a workpiece (116) has a support surface (124) for supporting a workpiece (116). The transfer apparatus (104) has a carriage (128) movable with respect to the support surface (124) between a loading location and an unloading location. The transfer apparatus (104) further has a drive mechanism (146, 150) operatively connected to the carriage (128) for moving the carriage (128). The carriage (128) has a lift member (230) moveable between a lowered position and a raised position relative to the support surface (124). The carriage (128) further has a push member (292) operatively connected with the lift member (230) to enable engagement of a workpiece (116) with the push member (292) and the lift member (230) to lift at least a portion of the workpiece (116) from the support surface (124) to decrease the factional engagement between the workpiece (116) and the support surface (124).

5 Claims, 28 Drawing Sheets

(51) Int. Cl.
  *B23Q 7/03*    (2006.01)
  *B65G 35/06*   (2006.01)
  *B23Q 7/00*    (2006.01)
  B21D 43/12     (2006.01)
  B21J 13/08     (2006.01)
  B65G 25/02     (2006.01)

(52) U.S. Cl.
  CPC .............. *B65G 35/06* (2013.01); *B21D 43/12* (2013.01); *B21J 13/08* (2013.01); *B65G 25/02* (2013.01)

(58) Field of Classification Search
  USPC ....... 198/463.3, 468.6, 468.7, 468.8, 468.77, 198/468.9
  See application file for complete search history.

(56) References Cited

U.S. PATENT DOCUMENTS

| | | |
|---|---|---|
| 3,655,070 A | 4/1972 | Haydu |
| 3,719,270 A | 3/1973 | Budris et al. |
| 4,440,292 A | 4/1984 | Regenbrecht |
| 2012/0222534 A1 | 9/2012 | Samprathi |

\* cited by examiner

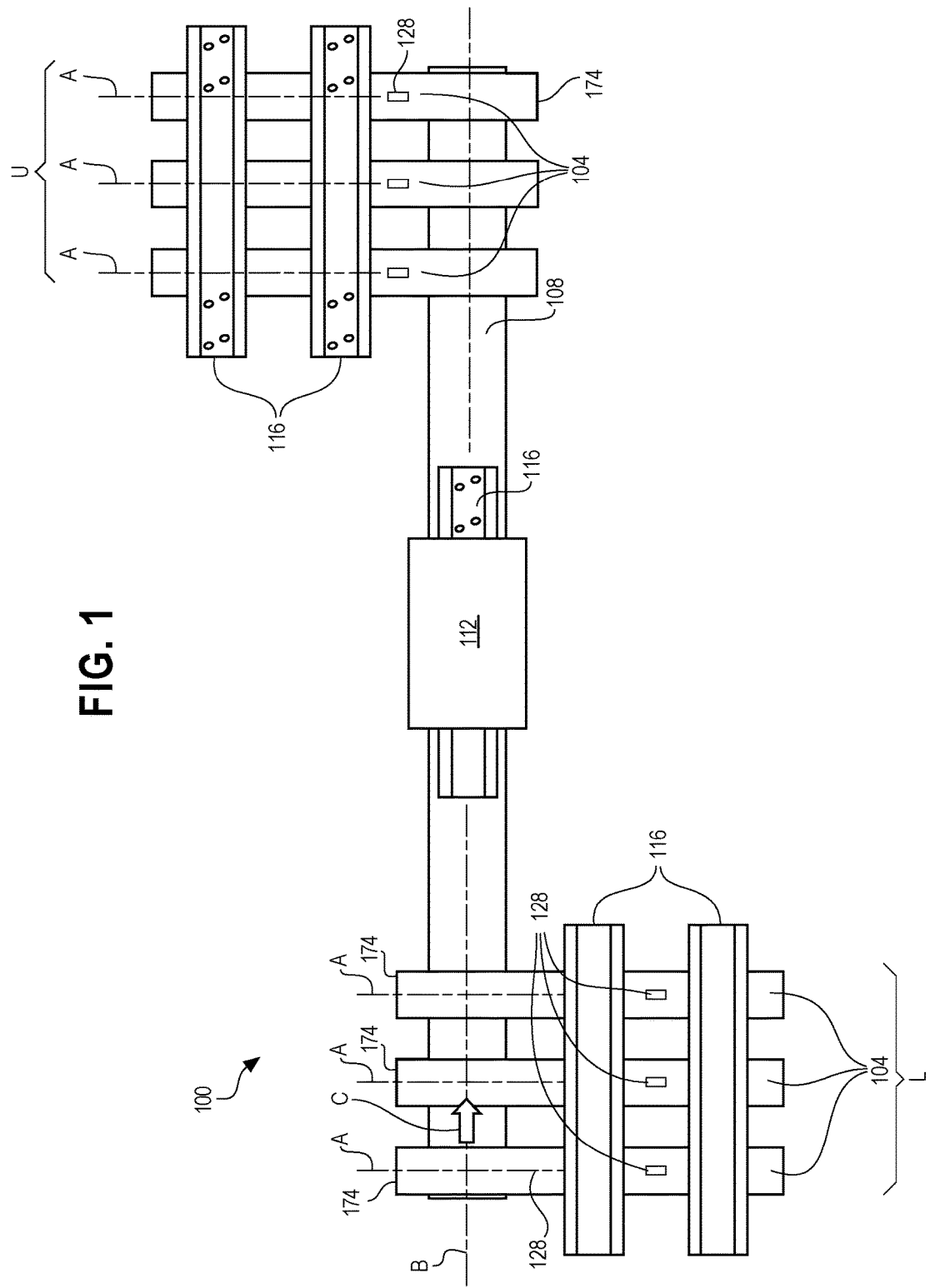

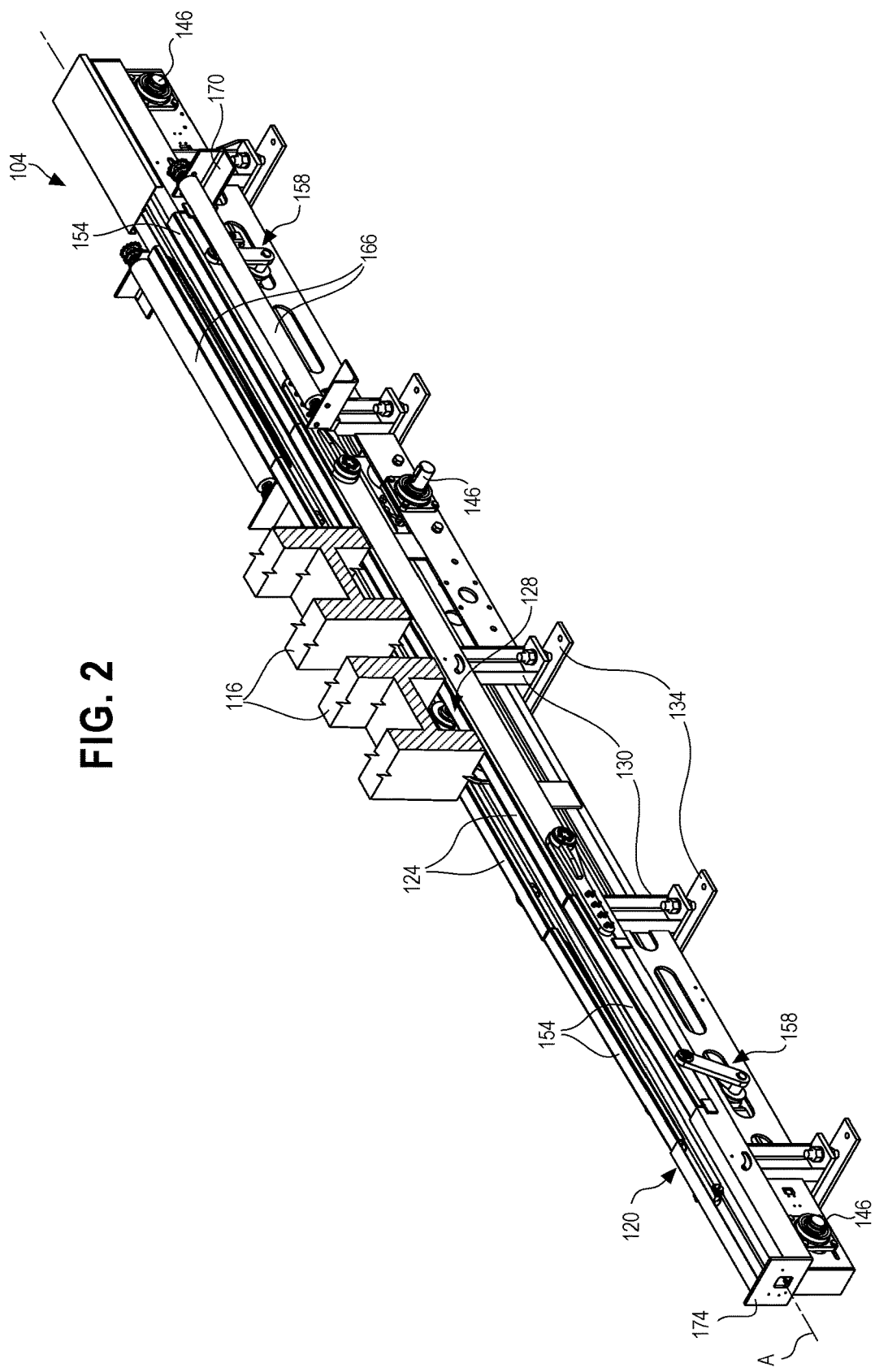

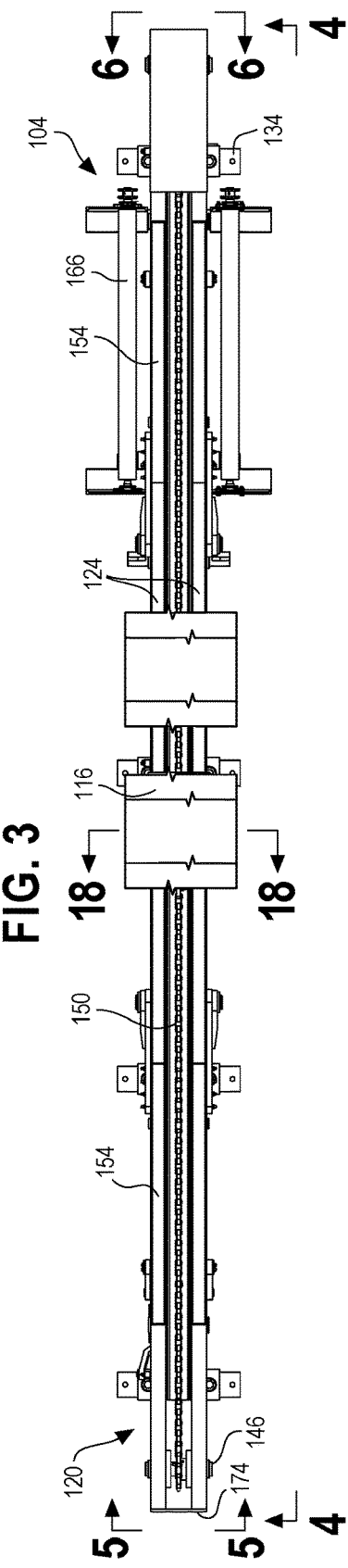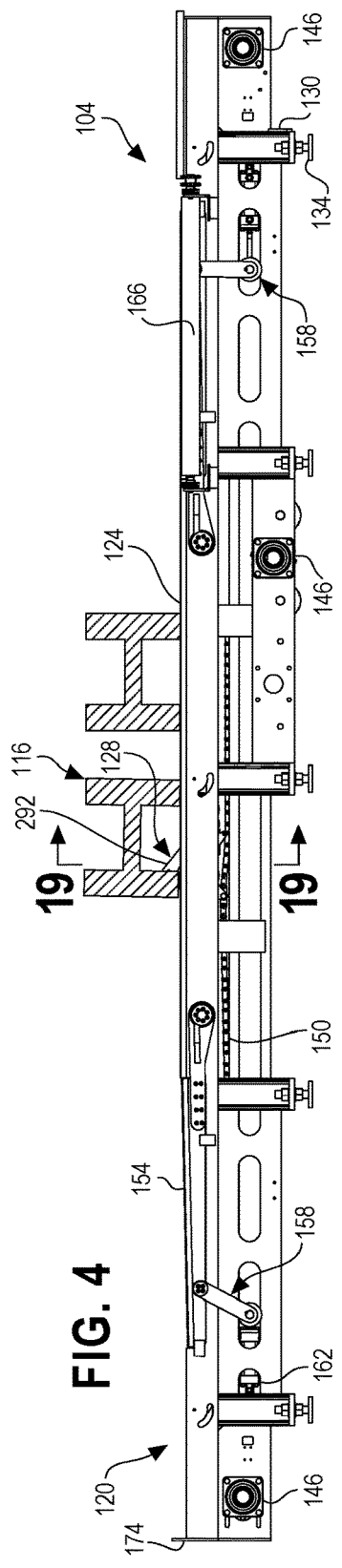

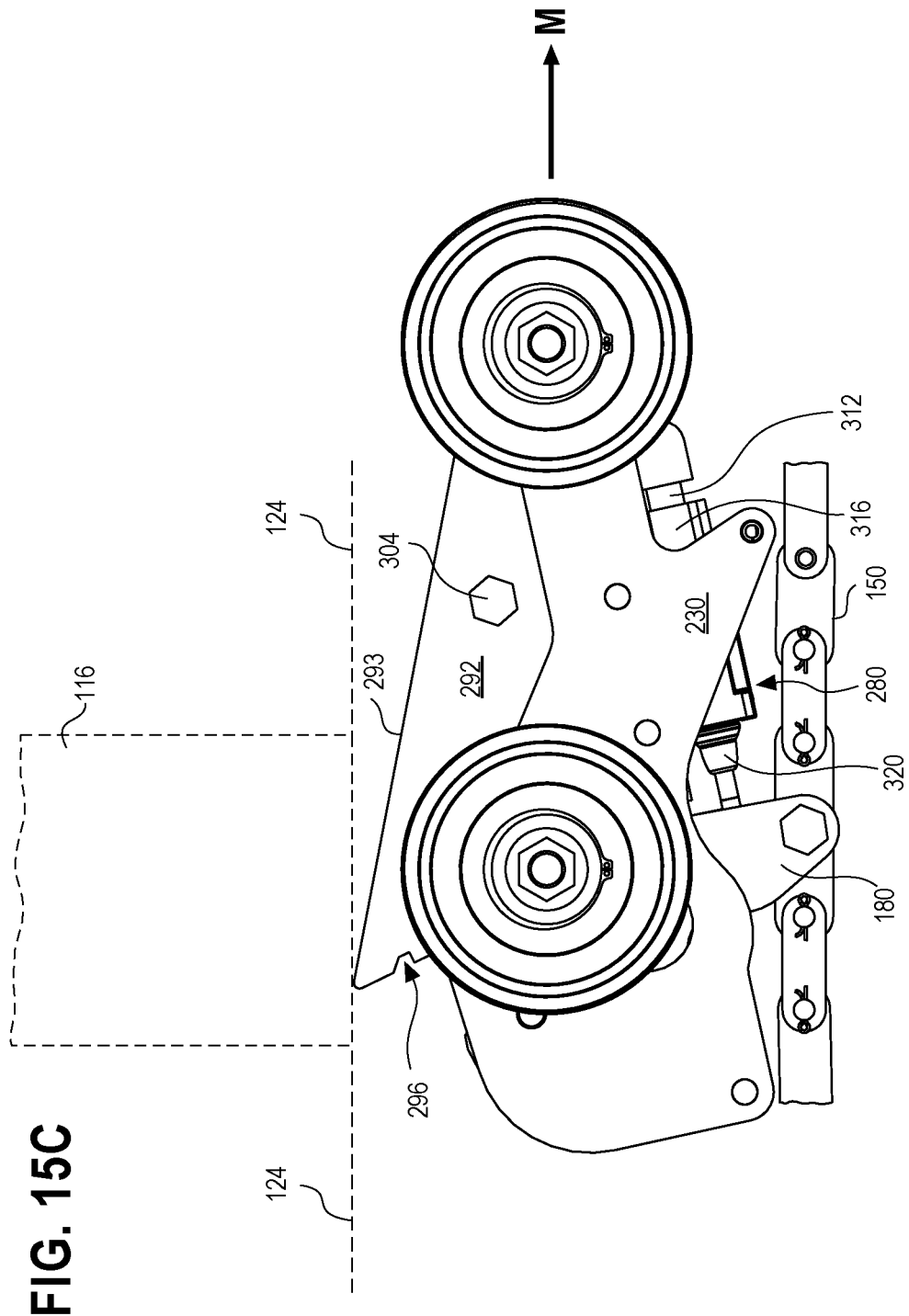

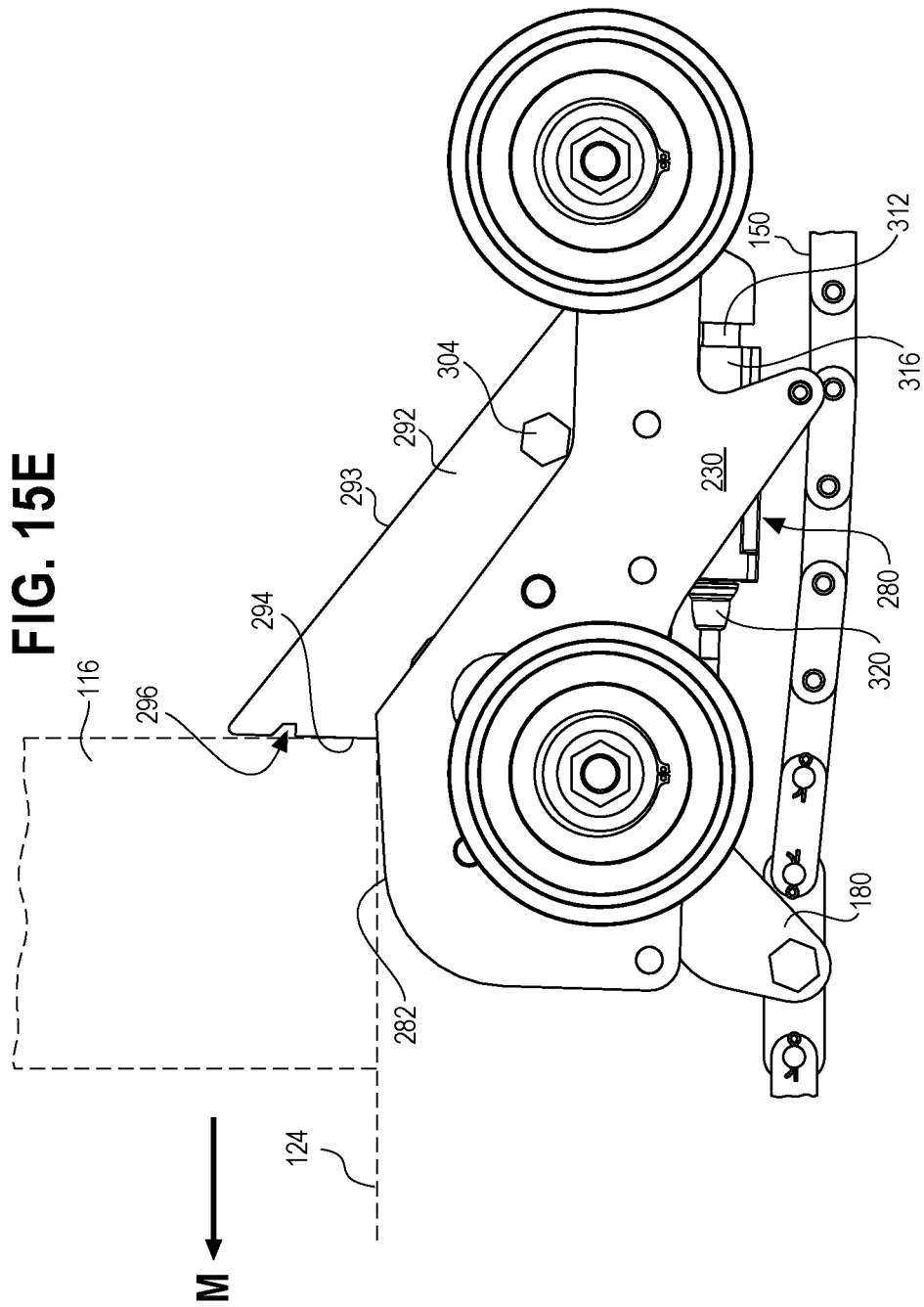

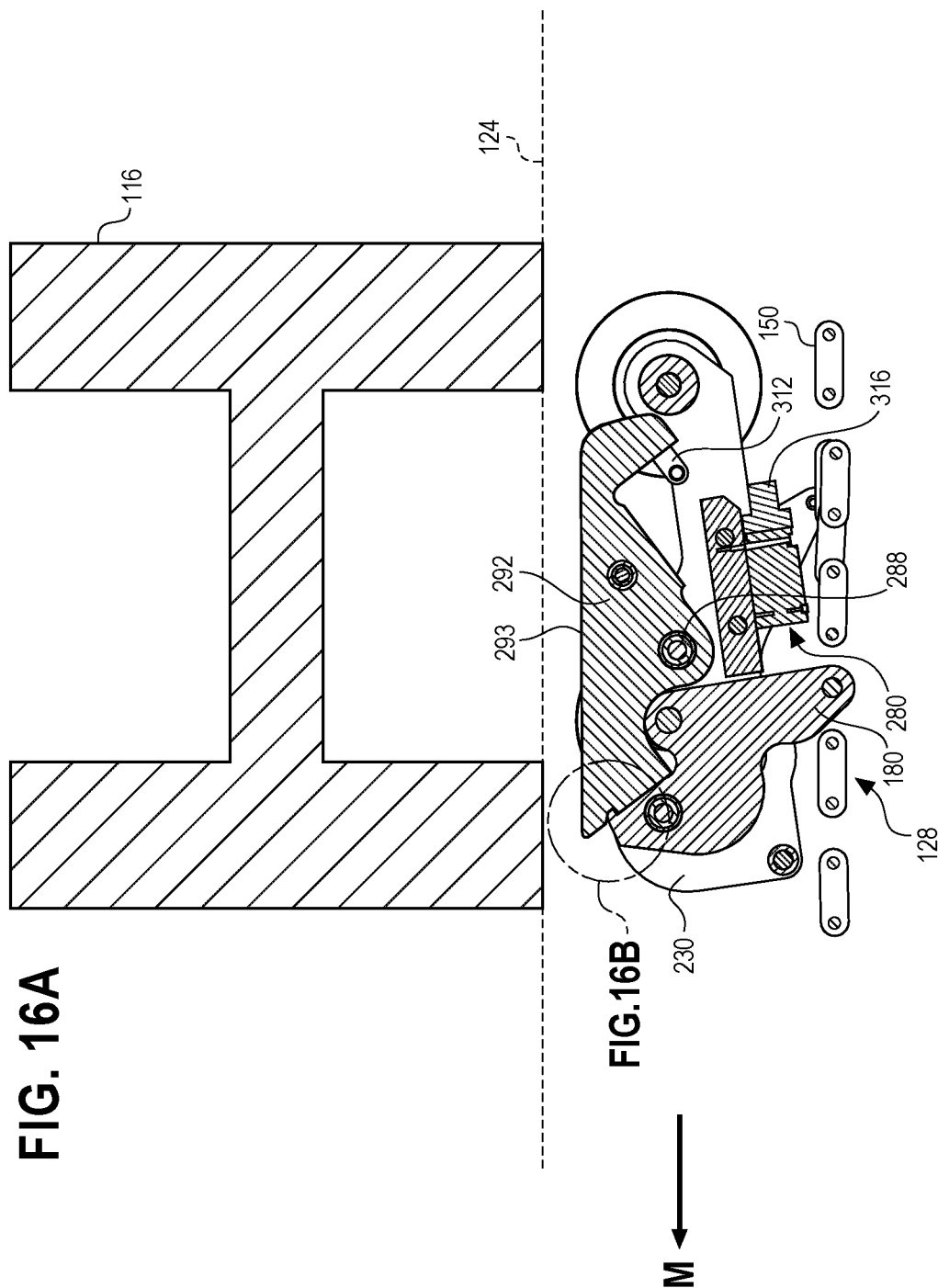

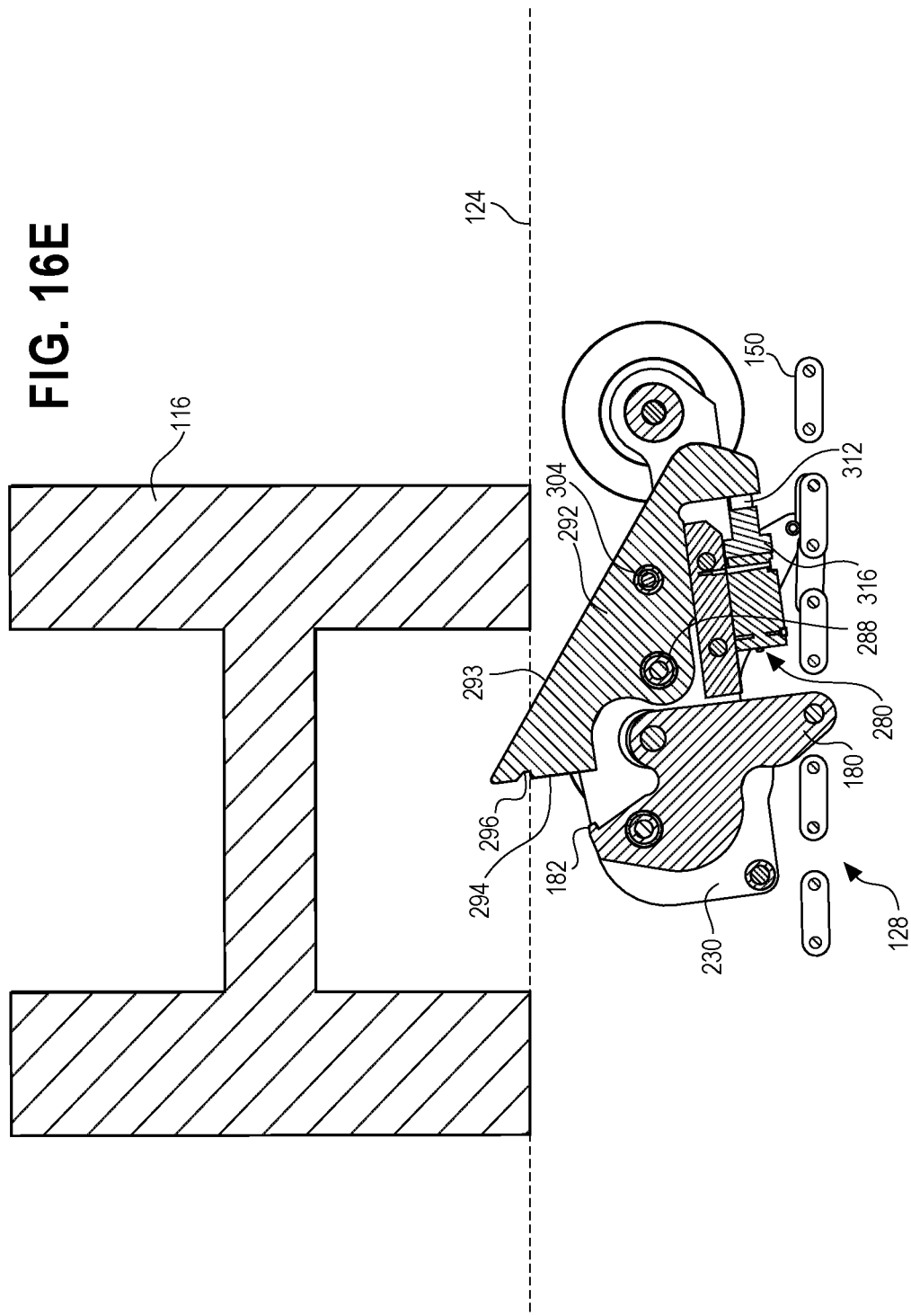

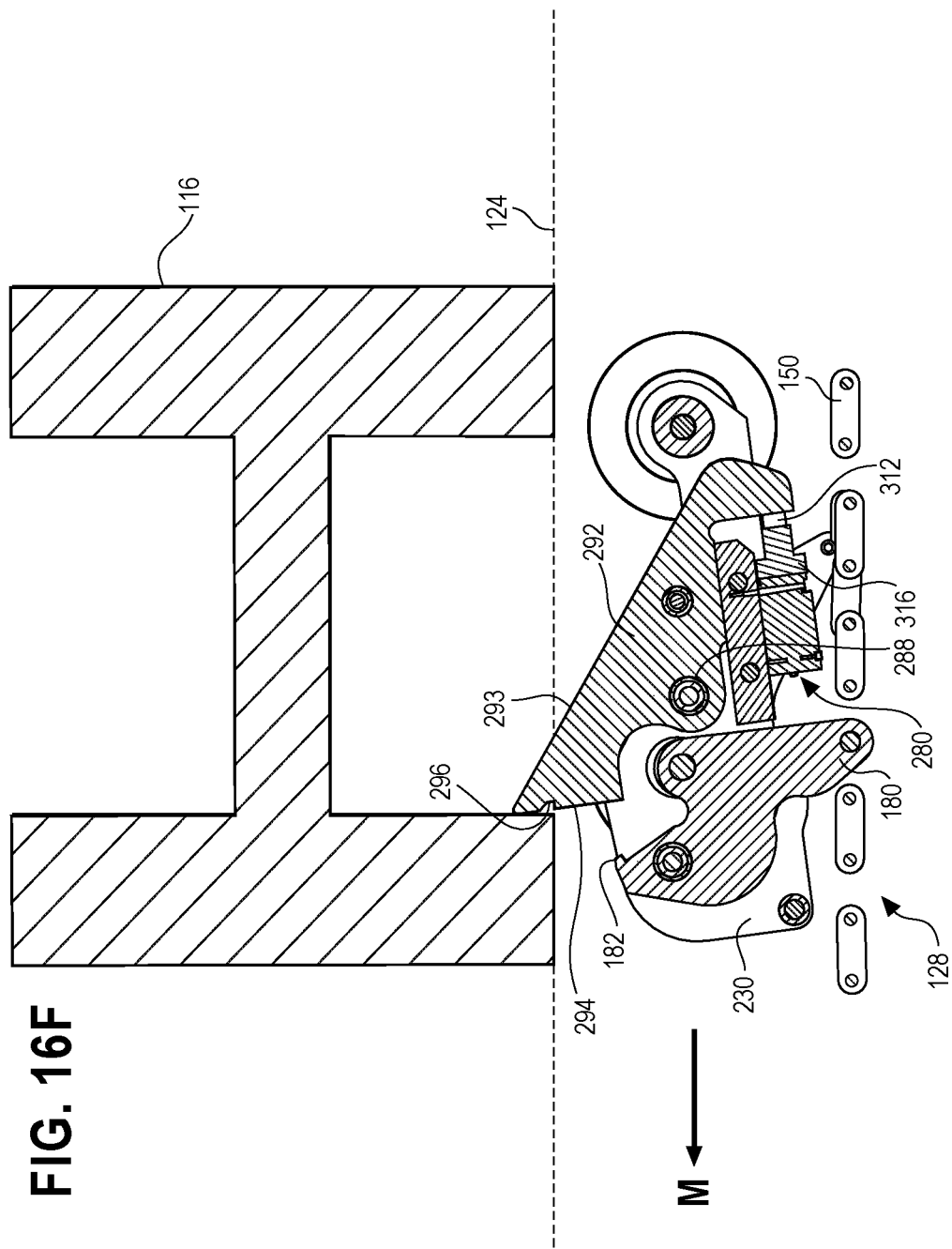

APPARATUS AND METHOD FOR MOVING A WORKPIECE

FIELD OF THE INVENTION

The present invention relates to an apparatus and method for moving a workpiece (including, for example, a piece of structural metal) between a storage area or transfer stand and a conveyor on which the workpiece can be conveyed prior to, during, or after processing. Such processing may involve severing a length of a workpiece into one or more shorter length segments, drilling or punching holes, cutting profiles in the workpiece with a torch, etc.

BACKGROUND OF THE INVENTION

Fabrication of a structural member or workpiece (such as, for example, a structural steel I-beam, wide flange H-beam, angle channel, flat plate, etc.) may require processing such as cutting, drilling, punching, and shearing portions of the workpiece. Conventional and specialized processing machines perform these processing operations. For example, a processing machine can be used to drill holes in a workpiece.

In one type of processing line or layout, one or more workpieces are supported lengthwise on a series of storage tables or transfer stands that are located adjacent to a conveyor. The conveyor leads to, and away from, one or more processing machines. The conveyor is typically an elevated structure having chain-driven rollers that define a conveying path and that are capable of supporting and conveying the workpiece along the conveying path. Each transfer stand is typically many times longer than its width. A plurality of such transfer stands are typically arranged in a spaced-apart, parallel relationship with each transfer stand oriented perpendicular to the conveying path. The transfer stands together support the workpiece lying across them while the workpiece waits to be transferred: (i) onto the conveyor for processing; or (ii) elsewhere subsequent to processing (e.g., such as being lifted off of the transfer stands by a forklift). Each of the transfer stands is typically an elevated structure with support surfaces that define a transfer path and that are capable of supporting one or more workpieces.

Some prior art transfer stands include a chain-driven carriage that is movable with respect to a support surface of the transfer stand, and the carriage further has a hydraulic lift. The carriage (i) travels underneath the workpiece, (ii) raises upwards through hydraulic actuation to lift the entire workpiece from the support surface of the transfer stand, (iii) moves the workpiece generally along the transfer path defined by the transfer stand, and then (iv) lowers the workpiece onto the rollers of the conveyor. This process may be reversed if the workpiece is being moved from the conveyor onto a transfer stand.

This process may be manually performed by an operator of the transfer stand, or it may be automated through the use of sensors and programmable logic controllers. For heavy workpieces such as wide flange, structural H-beams, the hydraulic lift-type carriage may require a large amount of force from the hydraulic lift, which must fully lift the workpiece in order to transfer the workpiece onto or off of the transfer stand. Furthermore, providing the carriage with a hydraulic lift may add to the complexity and manufacturing cost of the transfer stand.

Another type of prior art transfer stand contains a chain-driven, dragging carriage that is movable with respect to a support surface of the transfer stand. The carriage has a movable push member or "dog" that has a retracted position for allowing the carriage to travel past the workpiece, and the dog has a moved position for contacting a portion of the workpiece (e.g., such as a flange of the workpiece) to move the workpiece by pushing, pulling, or dragging the workpiece along a support surface of the transfer stand to the rollers of the conveyor, or vice versa. This process may also be manually performed by an operator of the transfer stand, or the process may be automated through the use of sensors and programmable logic controllers. For relatively heavy workpieces, however, the dragging-type carriage may also require a large amount of force from the chain drive due to the friction force created by the workpiece resting on the support surface of the transfer stand. Furthermore, dragging such a heavy workpiece in this manner may cause increased wear of the transfer table support surface, the conveyor rollers, and/or the chain drive of the dragging-type transfer table.

It would be desirable to provide an improved apparatus or transfer table for transferring a workpiece wherein the above-discussed problems of the prior art transfer tables could be eliminated, or at least substantially minimized.

It would be especially desirable for such an improved transfer table to reduce the forces required to move a workpiece, reduce wear on the transfer table, conveyor, and/or workpiece, and further eliminate the need for a complicated hydraulic carriage for lifting the workpiece.

It would further be desirable if such an improved transfer table could be readily operated by an appropriate control system, could accommodate a variety of different types of workpieces (e.g., flat plates, channels, angles, beams, etc.), could produce accurate and repeatable transfer of workpieces, and could relatively easily accommodate changes in the types and sizes of the workpieces being transferred.

It would also be beneficial if such an improved transfer table could cooperate with, and fit into, an existing processing line or layout.

Further, it would be beneficial if such an improved transfer table could be manufactured, installed, and operated without incurring excessive costs or expenses.

SUMMARY OF THE INVENTION

The present invention relates to an improved transfer apparatus for transferring a workpiece. The transfer apparatus has at least one workpiece support surface for supporting a workpiece. The transfer apparatus has a carriage movable with respect to the at least one support surface between a loading location and an unloading location. The transfer apparatus has a drive mechanism operatively connected to the carriage for moving the carriage between the loading location and the unloading location. The carriage has at least one lift member moveable between a lowered position relative to the at least one support surface and a raised position relative to the at least one support surface. The carriage has at least one push member operatively connected with the at least one lift member to enable engagement of a workpiece with the at least one push member and the at least one lift member to lift a portion of the workpiece from the at least one support surface to decrease the frictional engagement between the workpiece and the at least one support surface.

In another aspect of the invention, a method of transferring a workpiece with a transfer apparatus is provided, including the steps of (a) obtaining the inventive transfer apparatus discussed in the preceding paragraph; (b) loading at least a first workpiece onto the transfer apparatus; (c) moving the carriage of the transfer apparatus in a first direction with the drive mechanism such that the at least one push member engages the first workpiece; (d) moving the at least one lift member into the raised position above the at least one support surface to lift a first portion of the first workpiece from the at least one support surface; and (e) moving the carriage in the first direction whereby the first portion of the first workpiece is carried by the lift member as the first workpiece is pushed by the push member whereby a second portion of the first workpiece slides on the at least one support surface.

Other objects, features, and advantages of the invention will become apparent from a review of the entire specification, including the appended claims and drawings.

BRIEF DESCRIPTION OF THE DRAWINGS

FIG. 1 is a simplified plan view of a processing line or layout, including a machine, a conveyor, several transfer apparatuses according to the present invention located at both the inlet and outlet sides of the machine, several beams located upon the transfer apparatuses, and one beam being machined on the conveyor;

FIG. 2 is a perspective view, taken from above, of only a single transfer apparatus of FIG. 1, and FIG. 2 shows two beams located on the transfer apparatus, each beam having a greatly reduced length for purposes of illustration only;

FIG. 3 is a top plan view of the transfer apparatus and beams of FIG. 2;

FIG. 4 is a right side elevation view taken generally along the plane 4-4 in FIG. 3;

FIG. 12 shows the movable support surfaces in a raised position;

FIG. 14 shows the cam linkage engaging the carriage assembly push member;

FIG. 15A shows the push member of the carriage assembly in a lowered position and the carriage assembly moving forwardly beneath a beam;

FIG. 15B shows the push member of the carriage assembly moved into a raised position and shows the carriage assembly moving rearwardly toward the beam;

FIG. 15C is another right side elevation view similar to FIG. 15A, and FIG. 15C shows the push member of the carriage assembly sliding beneath a forward portion of the beam;

FIG. 15D shows the push member of the carriage assembly moved into a raised position and the carriage assembly moving forwardly to contact the forward portion of the beam;

FIG. 15E is another right side elevation view similar to FIG. 15A, and FIG. 15E shows the push member of the carriage assembly moved into a raised position and the lift members lifting a portion of a beam;

FIG. 16A is a cross-sectional view, taken generally along a vertical plane running through the center of the carriage assembly shown in FIG. 15A, and FIG. 16A shows the push member in a lowered position and the carriage assembly moving forwardly beneath a beam;

FIG. 16C shows the push member of the carriage assembly moved into a raised position and the carriage assembly moving rearwardly toward and under the beam;

FIG. 16D shows the push member of the carriage assembly sliding beneath a forward portion of the beam;

FIG. 16E is a cross-sectional view of the carriage assembly similar to FIG. 16C, and FIG. 16E shows a portion of the carriage assembly moved into a raised position under a portion of the beam;

FIG. 16F is a cross-sectional view, taken generally along a vertical plane running through the center of the carriage assembly shown in FIG. 15D, and FIG. 16F shows the push member of the carriage assembly moved into a raised position and moved forward into contact with the beam;

FIG. 16G shows the push member of the carriage assembly moved into a raised position and the lift members lifting a first or forward portion of a beam;

FIG. 17A shows one of the lift members of the carriage assembly in a lowered position prior to lifting a forward portion of a beam;

DETAILED DESCRIPTION OF THE PREFERRED EMBODIMENTS

Figure 5:
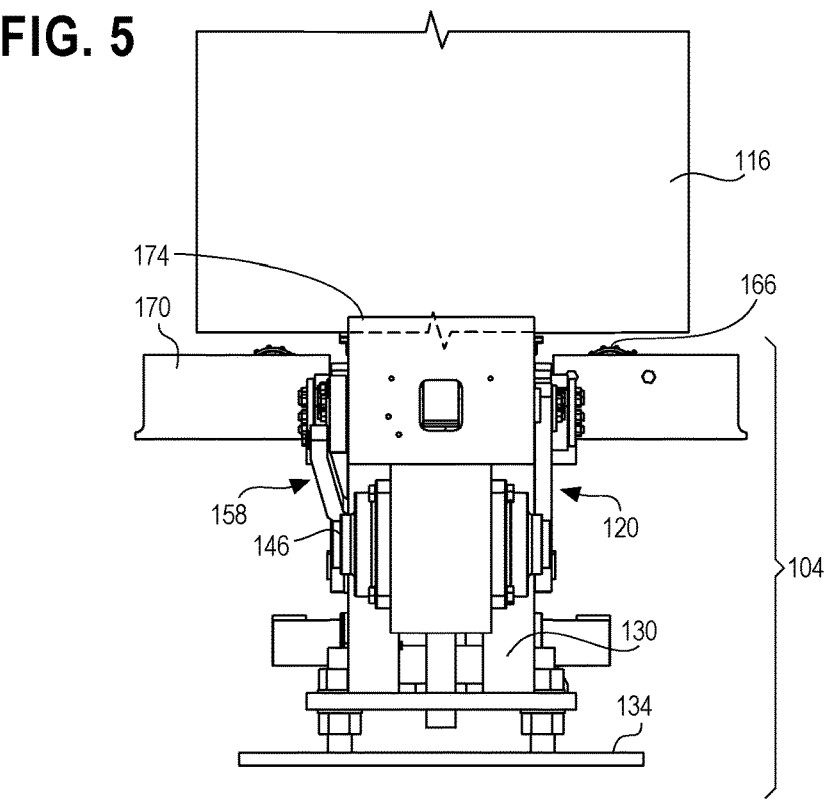
FIG. 5 is a front elevation view taken generally along the plane 5-5 in FIG. 3.
Figure 6:
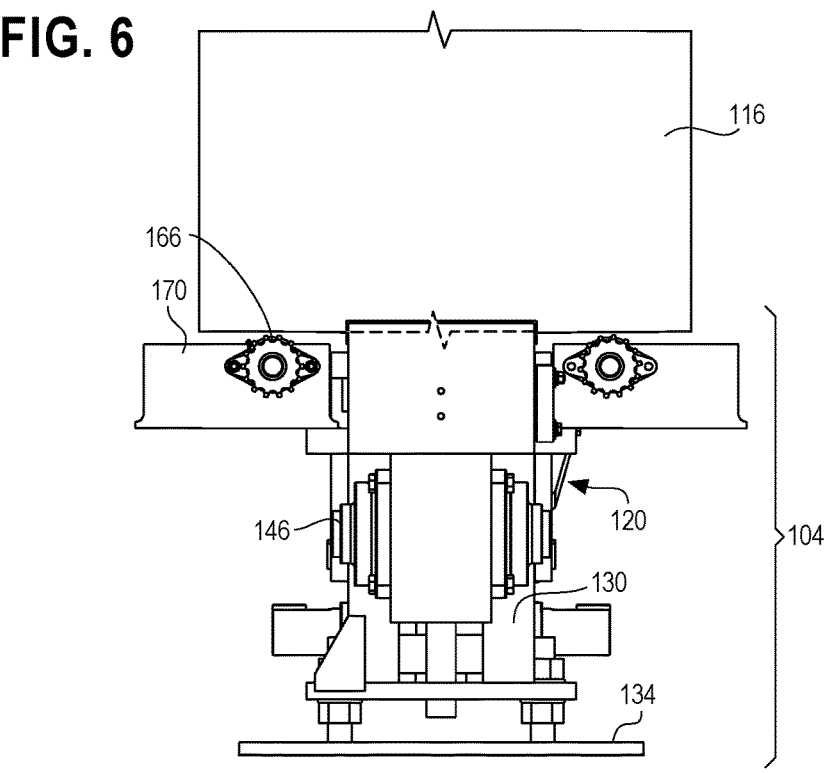
FIG. 6 is a rear elevation view taken generally along the plane 6-6 in FIG. 3.

While this invention is susceptible of embodiment in many different forms, this specification and the accompanying drawings disclose only a specific form as an example of the invention. The invention is not intended to be limited to the embodiment so described, and the scope of the invention will be pointed out in the appended claims.

For ease of description, many figures illustrating the invention show an embodiment in the typical orientation that one or more transfer stands or apparatuses 104 would have on a processing line or layout (100 in FIG. 1) adjacent a conveyor 108 at an inlet side and/or an outlet side of a processing machine 112. Terms such as forward, rearward, inward, outward, axial, radial, etc., are used with reference to this orientation. The term "forward" is used with respect to an axis "A" (FIG. 1), generally defined by an individual transfer stand 104, and which defines a general direction of travel of a workpiece along the transfer stand toward the conveyor 108. The term "rearward" is used with respect to the axis "A" which defines a general direction of travel of a workpiece along the transfer stand 104 away from the conveyor 108. The terms axial and lateral are also used with respect to an axis "B" (FIG. 1), generally defined by the pass line or main line of the conveyor 108 leading toward and/or away from a processing machine 112. It will be understood, however, that the transfer stand 104 of this invention may be manufactured, configured, assembled, used, and sold in an orientation other than the orientation described.

The transfer stand 104 of this invention is suitable for a variety of uses and need not be used on a processing line or layout. Furthermore, the transfer stand 104 is suitable for use with conventional or special workpieces, the details of which, although not fully illustrated or described, would be apparent to those having skill in the art and an understanding of such workpieces. Apart from the transfer stand 104, the particular processing line or layout 100 (arrangement of the conveyors, machines, and workpieces), per se, that is illustrated and described herein forms no part of, and therefore is not intended to limit, the present invention. It will also be understood by those of ordinary skill that novel and non-obvious inventive aspects are embodied in the described exemplary transfer stand 104 alone.

Furthermore, various components of the transfer stand 104 are shown assembled with nuts and bolts, retainer rings, cotter pins, or are permanently welded, and it will be appreciated that such components may be unitarily formed and/or may be assembled with other common fastening means as would be obvious to one of ordinary skill in the art.

The illustrated transfer stand 104 is especially suitable for use with heavy workpieces. Such workpieces may be large structural supports, for example, wide-flange H-beams, I-beams, C-beams for use in building construction. The weight per unit length of a very heavy wide flange H-beam processed in the United States of America may exceed about 1,100 kg/m, for example.

General Arrangement of Transfer Stands

A preferred embodiment of a transfer apparatus or transfer stand 104 of the present invention, and components thereof, is illustrated in FIGS. 1-19. The transfer stand 104 may also be characterized as a transfer apparatus 104. In the embodiment illustrated in FIG. 1, each transfer stand 104 is provided in the form of a separate piece of equipment, or apparatus, or machine which is adapted to be in communication with, or otherwise located adjacent to, the conveyor 108 that leads to an inlet side of the processing machine 112. The conveyor 108 further leads away from an outlet side of the processing machine 112. In FIG. 1, two workpieces in the form of wide-flange H-beams or simply "beams" 116 are shown resting on three transfer stands 104 at a loading station L for the conveyor 108 on the inlet side of the processing machine 112, one beam 116 is shown being processed within the machine 112, and two beams 116 are shown resting on three transfer stands 104 at the outlet side of the processing machine 112 at an unloading station U. It will be appreciated that this particular arrangement of the processing line 100 may be altered based on the length of the beam, length of the conveyor 108, number of machines 112, type of beam 116, etc. Further, the invention contemplates that in many applications a number of transfer stands 104 may be employed in parallel, but in some applications only one transfer stand 104 might be used at the loading station L or the unloading station U.

Transfer Stand Frame and Components Thereof

Referring next to FIGS. 2 and 4, the illustrated preferred embodiment of the transfer stand 104 has the primary components of (i) a stationary body or frame 120 having a one or more workpiece support surfaces, or simply "support surfaces," 124 for supporting one or more beams 116, and (ii) a carriage or carriage assembly 128 is movable with respect to the support surfaces 124 and that is configured to both lift a first (front or forward) portion of a beam 116 while pushing the beam 116 to drag it while it is resting on a second (rear or rearward) portion of the beam 116 so that the entire beam 116 moves generally along the axis A (FIG. 18) of the transfer stand 104, all of which will be discussed in greater detail hereinafter.

Referring next to FIGS. 2 and 5, the frame 120 that is supported by a plurality of pairs of legs 130. Each pair of legs 130 terminates in a unitary foot 134 for resting on the floor or the ground. The components of the transfer stand 104, such as the frame 120, legs 130, and feet 134 are preferably made of steel, but may be made of any material that can withstand the weight of the particular workpieces or beams 116 being manipulated. The support surfaces 124 (FIG. 18) have the form of a pair of spaced-apart rails, upon which the beams 116 rest. In the illustrated embodiment of the transfer stand 104, each support surface 124 is formed from a low surface friction, replaceable material, such as ultrahigh molecular weight (UHMW) polyethylene, which may be replaced as the support surface 124 is worn by the friction and weight of the beams 116. Each support surface 124 is preferably formed from a strip of UHMW polyethylene that is installed on the top of the frame 120 (FIG. 19) in a suitable conventional or special manner that permits the removal and replacement of the strip. The details of such an installation form no part of the present invention. It will be understood that the support surfaces may be formed from any other durable polymer, metal, composite, coated or treated wood, or other suitable replaceable surface material.

Figure 18:
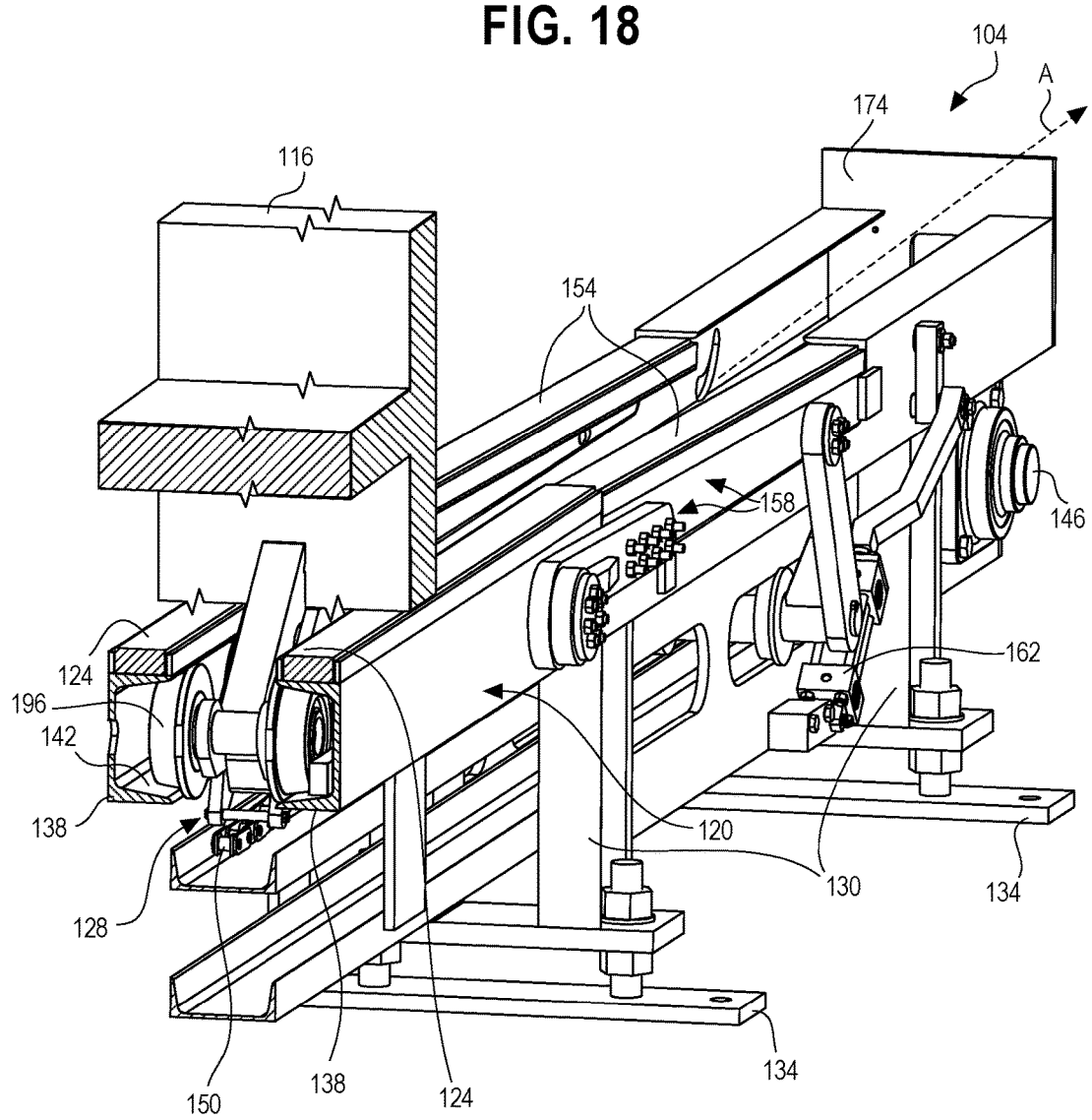
FIG. 18 is a cross-sectional view of the transfer apparatus and a beam taken generally along plane 18-18 in FIG. 3.
Figure 19:
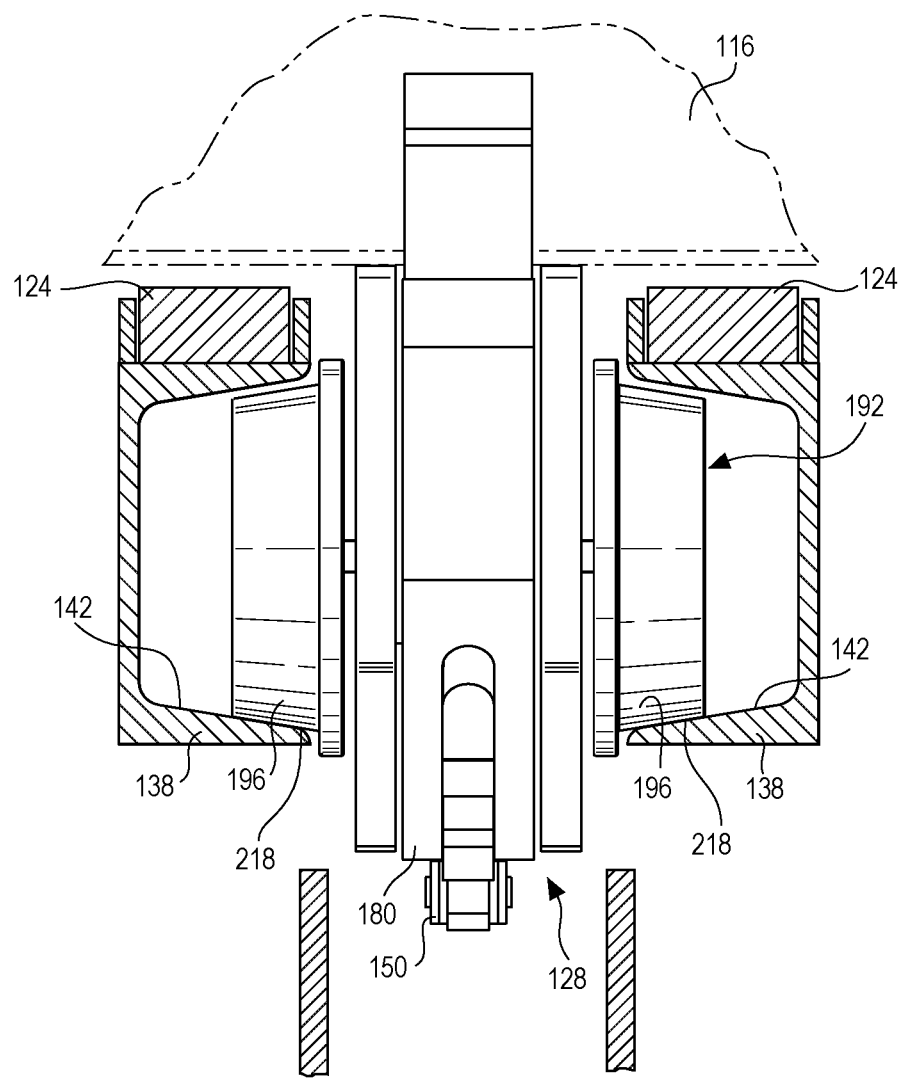
FIG. 19 a cross-sectional view of the transfer apparatus taken generally along plane 19-19 in FIG. 4.

Referring now to FIGS. 18 and 19, beneath the support surface 124, the frame 120 has a pair of elongate channels 138, each having a sloping, interior surface 142 for supporting and restraining the movement of the carriage assembly 128, which will be described in detail hereinafter.

Figure 7:
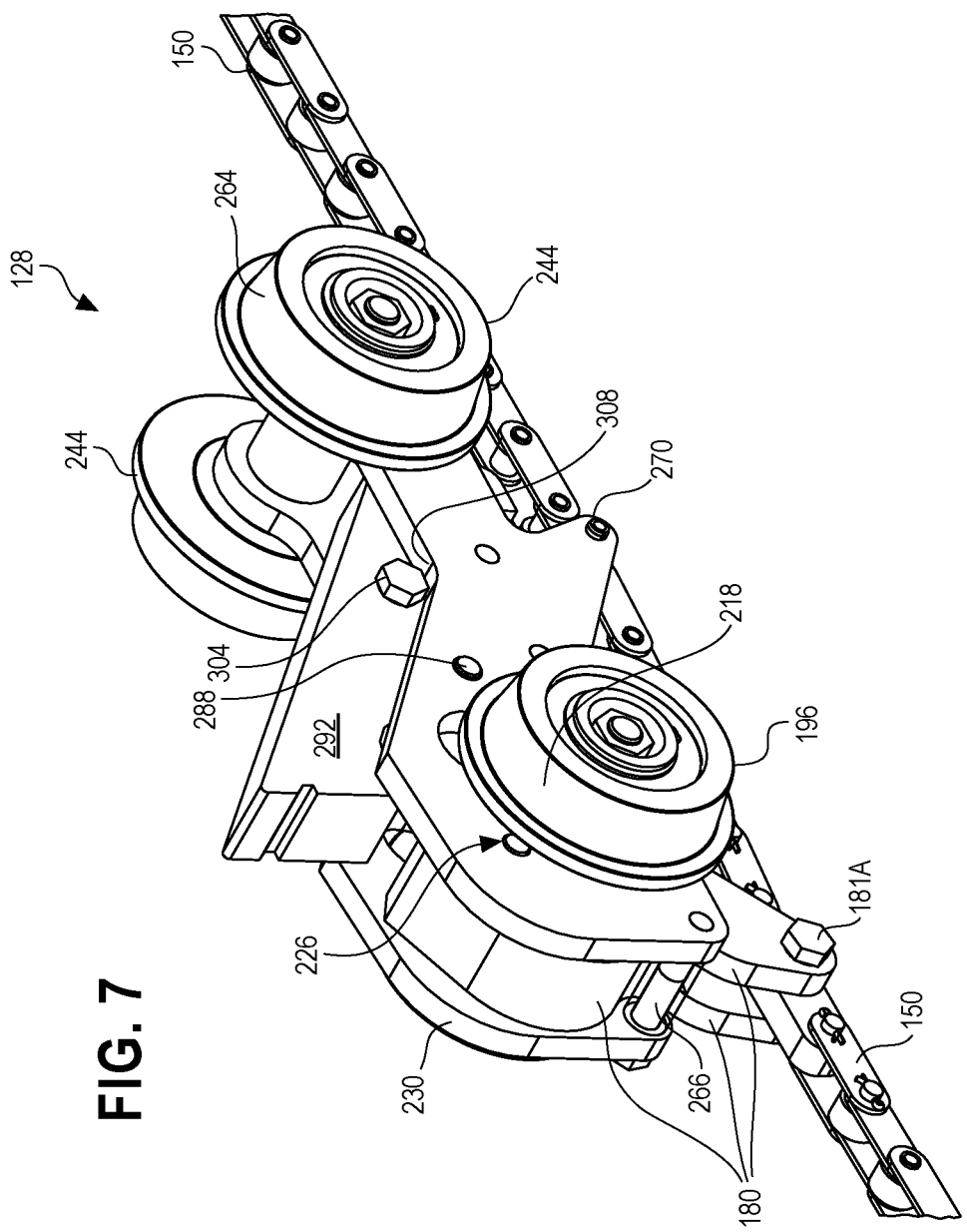
FIG. 7 is a perspective view taken from above of just the carriage assembly of the transfer stand of FIG. 2.

Referring now to FIGS. 4, 7, and 18, the transfer stand 104 has a drive mechanism or motor 146 configured to rotate a shaft having an external gear for mating with, and driving, a chain 150. The carriage assembly 128 (FIG. 7) is attached to a portion of the chain 150 to enable the carriage assembly 128 to be driven by the motor 146 generally along the axis "A" (FIG. 18). The motor 146 is preferably a 7.5 kW electric induction motor manufactured by General Electric, but could alternatively have the form of a hydraulic motor, a combustion engine, etc., or other suitable power source capable of moving a particular workpiece. The chain is preferably size 100 double pitch roller chain. However, the chain 150 could alternatively be replaced by a cable, belt, track for a linear motor, or other conventional or special means capable of generating relative linear movement of the carriage assembly 128 with respect to the stationary transfer stand 104

Figure 11:
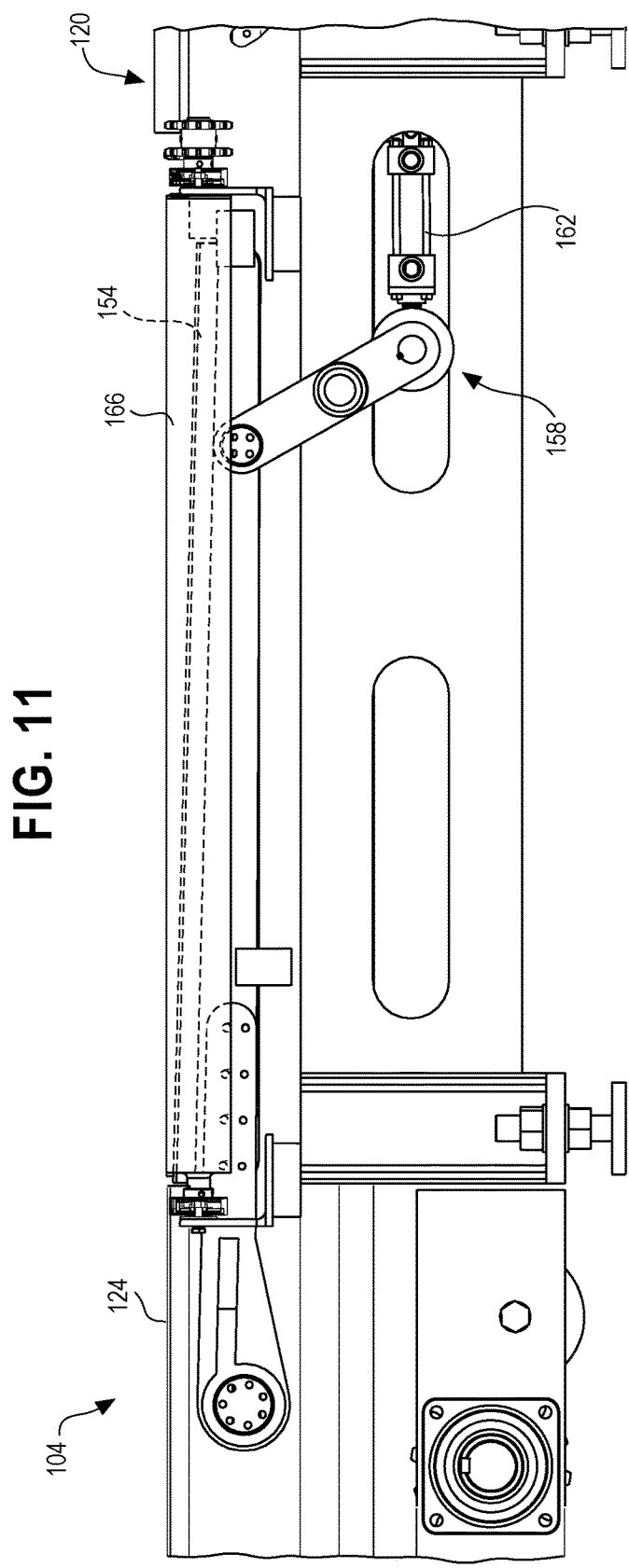
FIG. 11 is a fragmentary, enlarged, right side elevation view of a portion of the transfer apparatus shown in FIG. 2.
Figure 12:
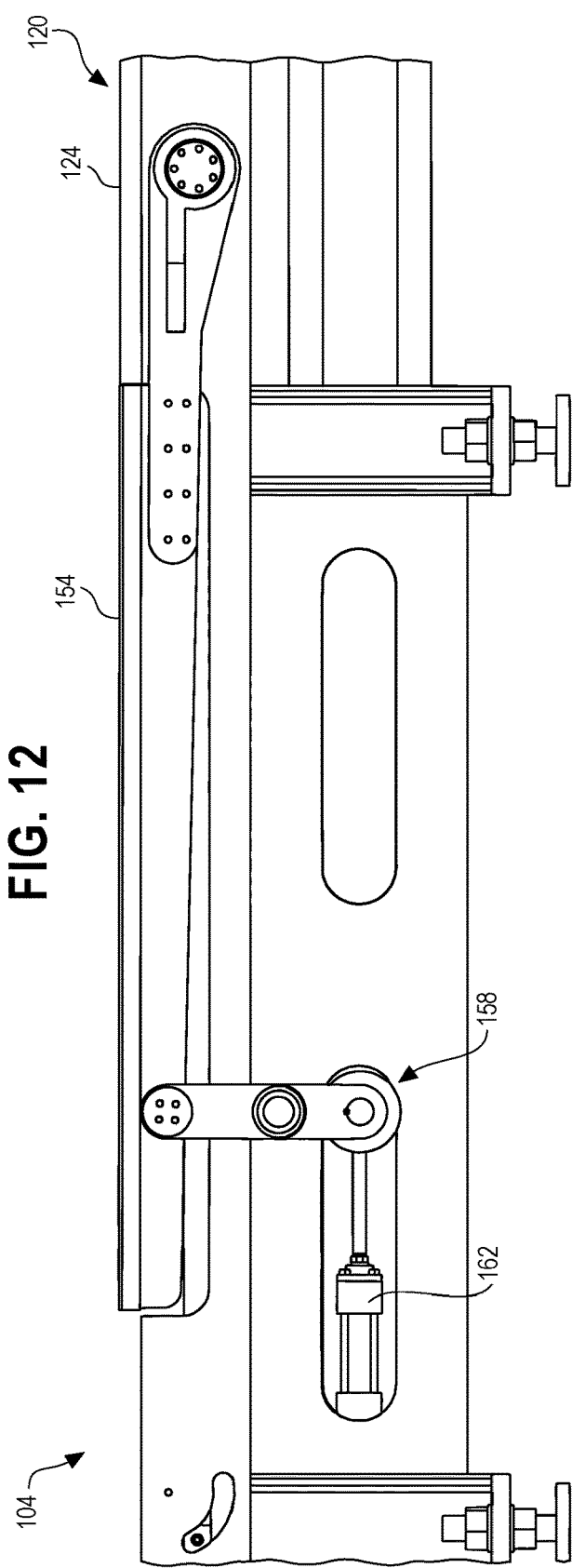
FIG. 12 is another fragmentary, enlarged, right side elevation view similar to FIG. 11, but FIG. 2.

As can be seen in FIGS. 11, 12, and 18, near each end of the transfer stand 104 there are a pair of spaced-apart skids or movable support surfaces 154 to assist in loading and/or unloading beams 116 (visible in FIG. 18) onto or off of the transfer stand 104. Each pair of movable support surfaces 154 is connected to a linkage 158 that is powered by an actuator 162. The actuator 162 drives the linkage 158 with respect to the frame 120 to raise and lower the movable support surfaces 154 between positions above or below the support surfaces 124. The actuator 162 in the illustrated embodiment is a hydraulic actuator manufactured by Parker Hannifin, but such actuators may alternatively be replaced by an electric linear actuator, a pneumatic actuator, or any suitable power source for powering the linkage 158 so as to raise and lower the movable support surfaces 154. The linkage 158 could be replaced by a winch, chain, gears, or any other suitable mechanism to raise and lower one end of the support surfaces 154. It will be appreciated that the transfer stand 104 need not be provided with any movable support surfaces 154, linkage 158, or actuator 162 depending on the desired application of the transfer stand 104.

Referring now to FIG. 2, the transfer stand 104 has a pair of rollers 166 located adjacent to a pair of the movable support surfaces 154. The rollers 166 are rotatably fixed within a pair of angle brackets 170, which in turn are fixed to the frame 120. The rollers 166 may be driven by a chain, belt, or cable and may be located adjacent to, or otherwise in communication with, a conveyor (e.g., conveyor 108 in FIG. 1) so as to receive and position a beam 116 between multiple transfer stands 104, in a direction generally perpendicular to axis "A" (FIG. 1). The rollers 166 can support a beam 116 being moved from or to a vehicle, such as a fork lift, or crane. The movable support surfaces 154 enable a beam 116 to be lowered onto, or off of, the rollers 166 without developing a large, potentially damaging, axial or thrust force on the rollers 166, as will be discussed hereinafter. It will be appreciated that the transfer stand 104 need not be provided with any rollers 166, depending on the desired application of the transfer stand 104.

Referring now to FIGS. 4 and 18, the transfer stand 104 has a stop or end plate 174 fixed to the frame 120. The end plate 174 may serve as a datum or positioning line for the beam 116 after the beam 116 has been conveyed by the carriage assembly 128 generally along the axis "A" (visible in FIG. 18) to one end of the transfer stand 104. If used as a datum, then the end plate 174 locates the beam 116 prior to being conveyed by the conveyor 108 (illustrated in FIG. 1) toward the processing machine 112 (illustrated in FIG. 1). The end plate 174 is located proximal to a set of movable support surfaces 154 (FIG. 12) assisting in transferring the beam onto, or off of, the conveyor 108 leading toward or away from the processing machine 112. The set of movable support surfaces 154 that are proximal to the end plate 174 function identically to the aforementioned movable support surfaces 154 proximal to the rollers 166.

Figure 13:
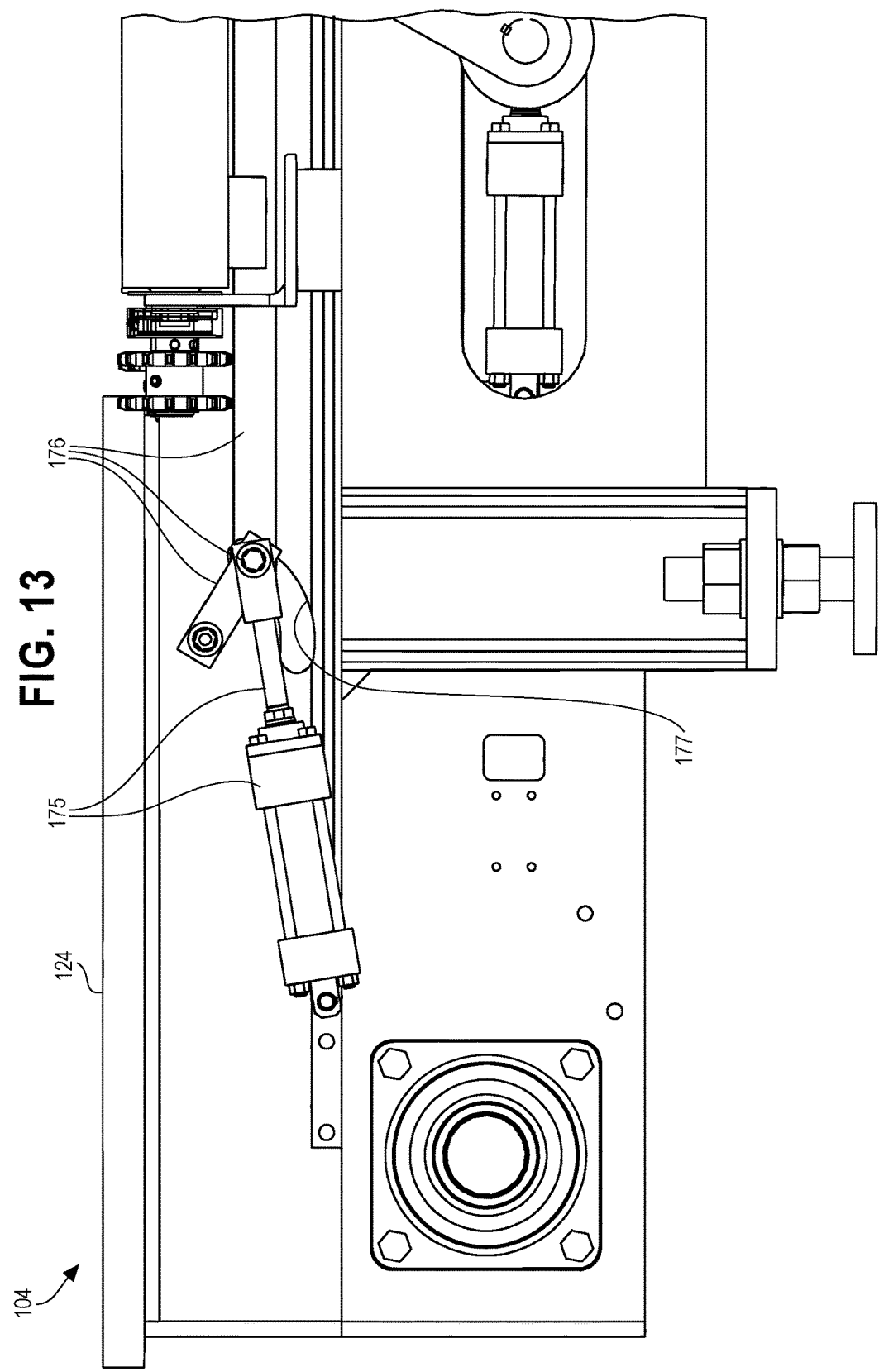
FIG. 13 is a fragmentary, enlarged, left side elevation view of a cam actuator and linkage of the transfer apparatus shown in FIG. 2.
Figure 14:
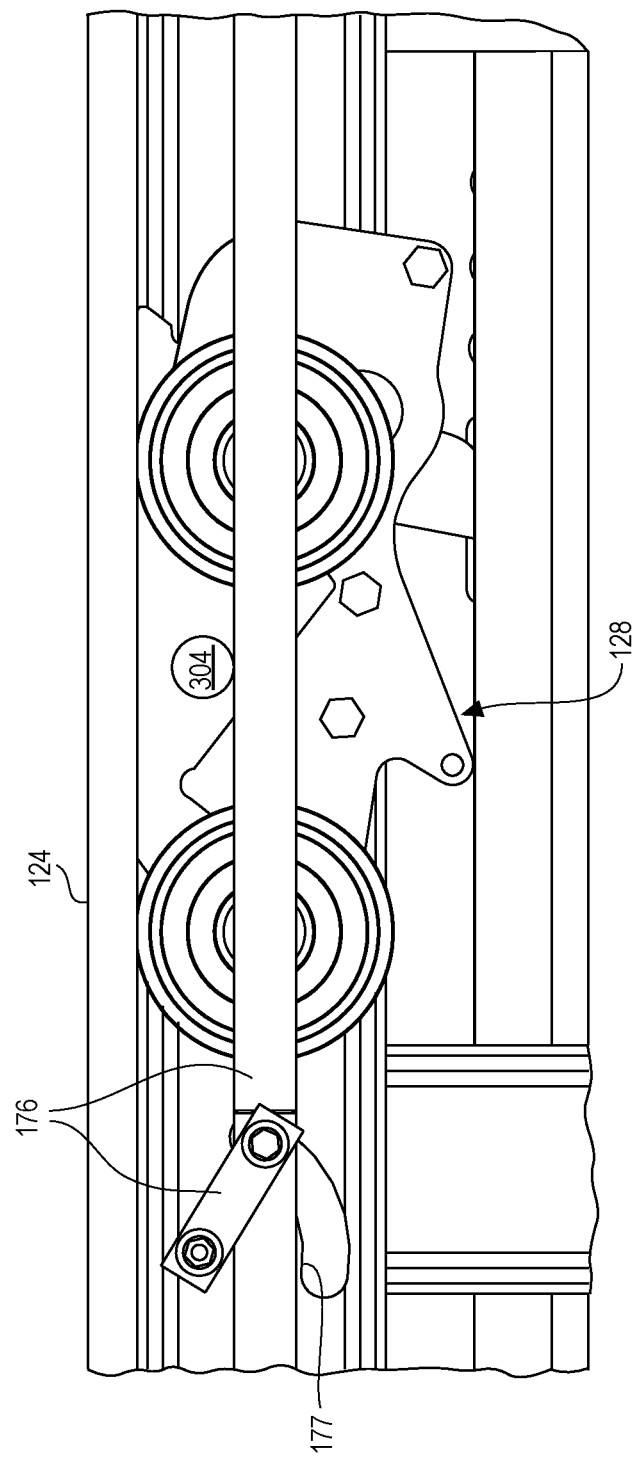
FIG. 14 is a fragmentary, enlarged, left side elevation view of the cam linkage shown in FIG. 13.

Referring next to FIG. 13, the transfer stand 104 has a cam actuator 175 that is connected to a linkage or cam 176. The cam 176 is movable within a plurality of elongate, curved channels or surfaces 177 located in the frame 120 (FIGS. 4, 13, and 14). As can be seen in FIG. 14, the function of the cam 176 is to engage and rotate a portion of the carriage assembly 128 to permit the carriage assembly 128 to travel forwardly past one or more beams 116 (for example, as shown in FIG. 16A), the details of which are discussed hereinafter.

The Carriage Assembly

The details of the carriage assembly 128 will now be discussed with reference to FIGS. 7, 9, and 10. The carriage assembly 128 has a lever or drive member 180 that is rotatably attached to the drive chain 150. Specifically, the drive member 180 has a first, bifurcated end that straddles and is attachable to the chain 150 by way of an aperture 181 (FIG. 10) for receiving a shaft or bolt 181A therein (FIG. 7). The drive member 180 has a second end which terminates in a tooth or projection 182 (FIG. 10) for mating with another component of the carriage assembly 128, as discussed in detail hereinafter.

Figure 9:
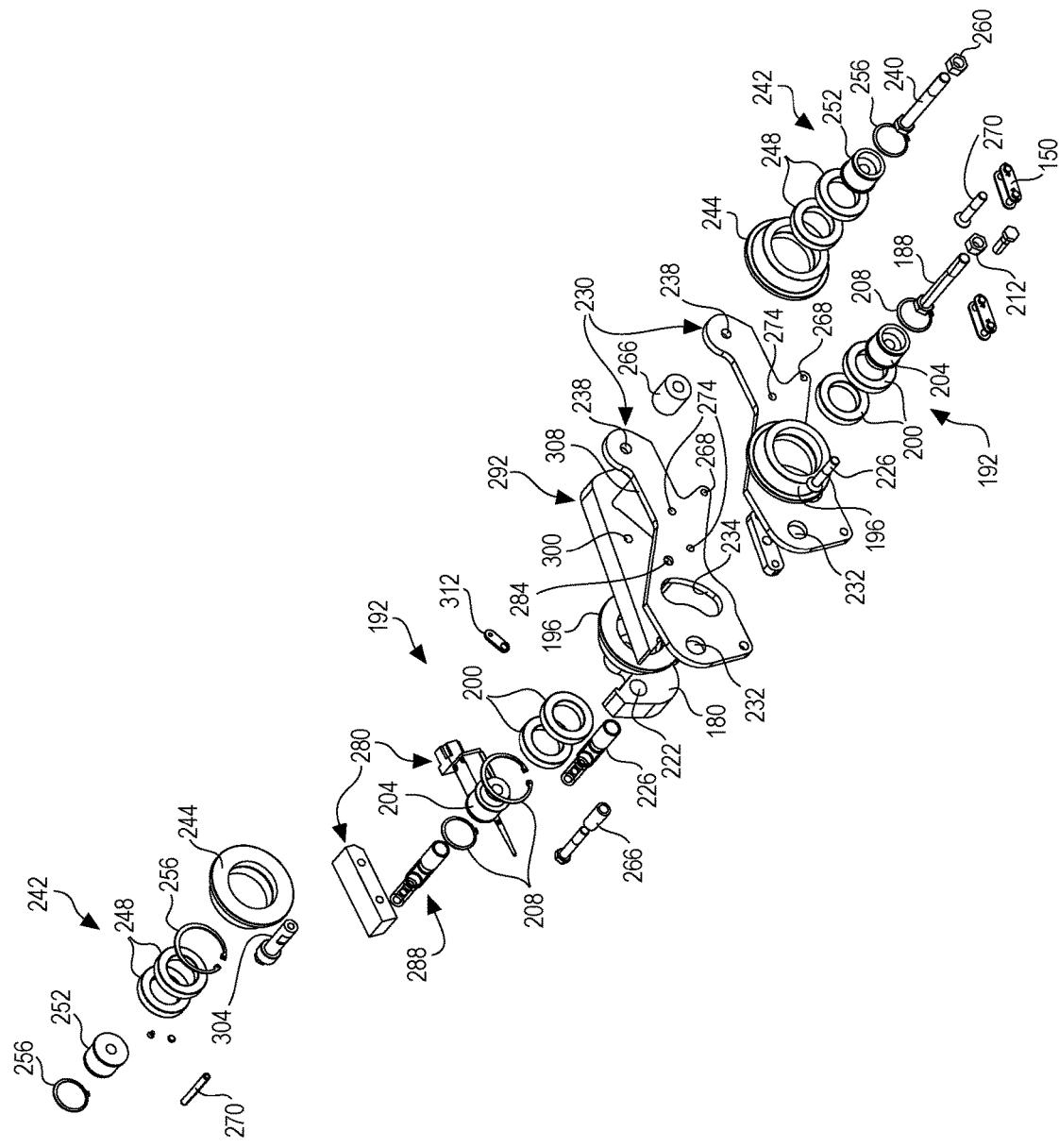
FIG. 9 is an exploded view of the carriage assembly shown in FIG. 7.

Referring to FIG. 9, the drive member 180 further has an aperture 184 (FIG. 10) for receiving a shaft or bolt 188, which is part of a front or first wheel assembly 192. The first wheel assembly 192 has, in addition to the bolt 188, a pair of wheels 196, a plurality of bearings 200, a pair of axle end members or cam members 204, retainer rings 208, and an end nut 212. Each wheel 196 has a sloping, frustoconical surface 218 (FIG. 19) for rolling on the surfaces 142 of the channels 138 (FIG. 19).

Figure 10:
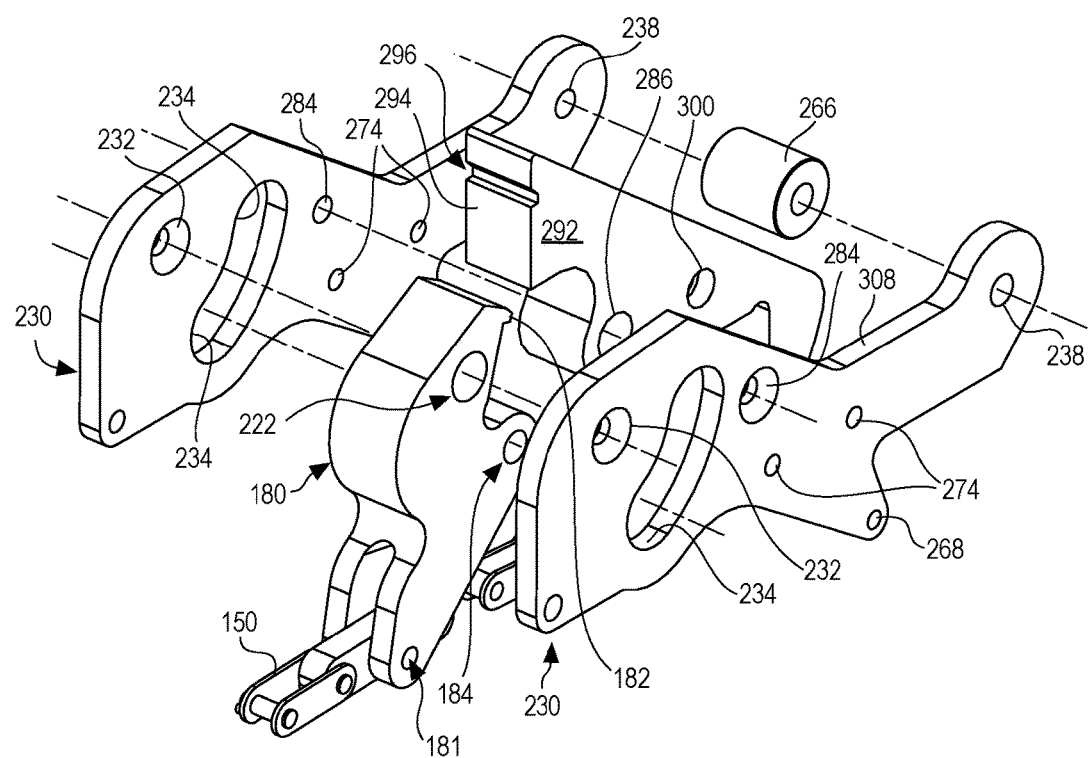
FIG. 10 is an exploded view of selected components of the carriage assembly shown in FIG. 7.

As can be seen in FIG. 10, the carriage assembly drive member 180 further has a connecting aperture 222 for receiving a connector accommodating rotation, such as a pin or shaft 226 (FIGS. 7 and 9). The shaft 226 connects a pair of workpiece lifting plates or lift members 230 on either side of the drive member 180.

Referring to FIG. 9, each lift member 230 has an aperture 232 for accommodating or receiving the shaft 226. Each lift member 230 further has an internal cam surface or elongate aperture 234 for accommodating a cam member 204 of the first wheel assembly 192. The elongate aperture 234 in each lift member 230 allows each lift member 230 to be movable with respect to the first wheel assembly 192, which itself is constrained within the channel 138 (FIG. 18), as will be discussed hereinafter. Each lift member 230 further has a rear aperture 238 for receiving a shaft or bolt 240 that is part of a rear or second wheel assembly 242.

Still referring to FIG. 9, the second wheel assembly 242 has, in addition to the bolt 240, a pair of wheels 244, a plurality of bearings 248, a pair of axle end members 252, retainer rings 256, and an end nut 260. Each wheel 244 also has a sloping, frustoconical surface 264 (FIG. 7) for rolling on the sloping surfaces 142 of the channels 138 (FIG. 19). A spacer 266 (FIGS. 9 and 10) is located between the lift members 230 to provide additional structural stability of the carriage assembly 128.

Figure 17A:
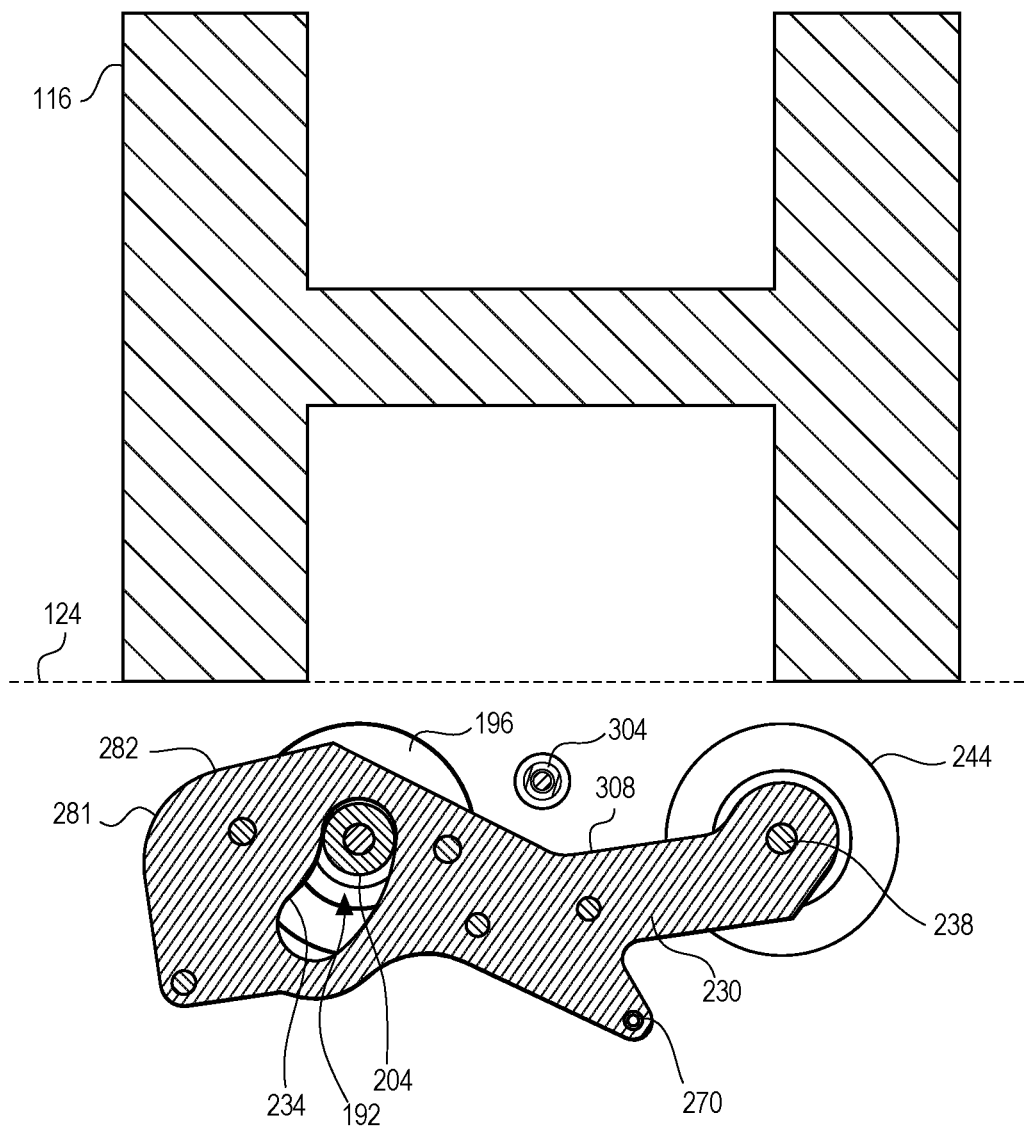
FIG. 17A is a cross-sectional view of the carriage assembly taken along plane 17A-17A in FIG. 8.
Figure 17B:
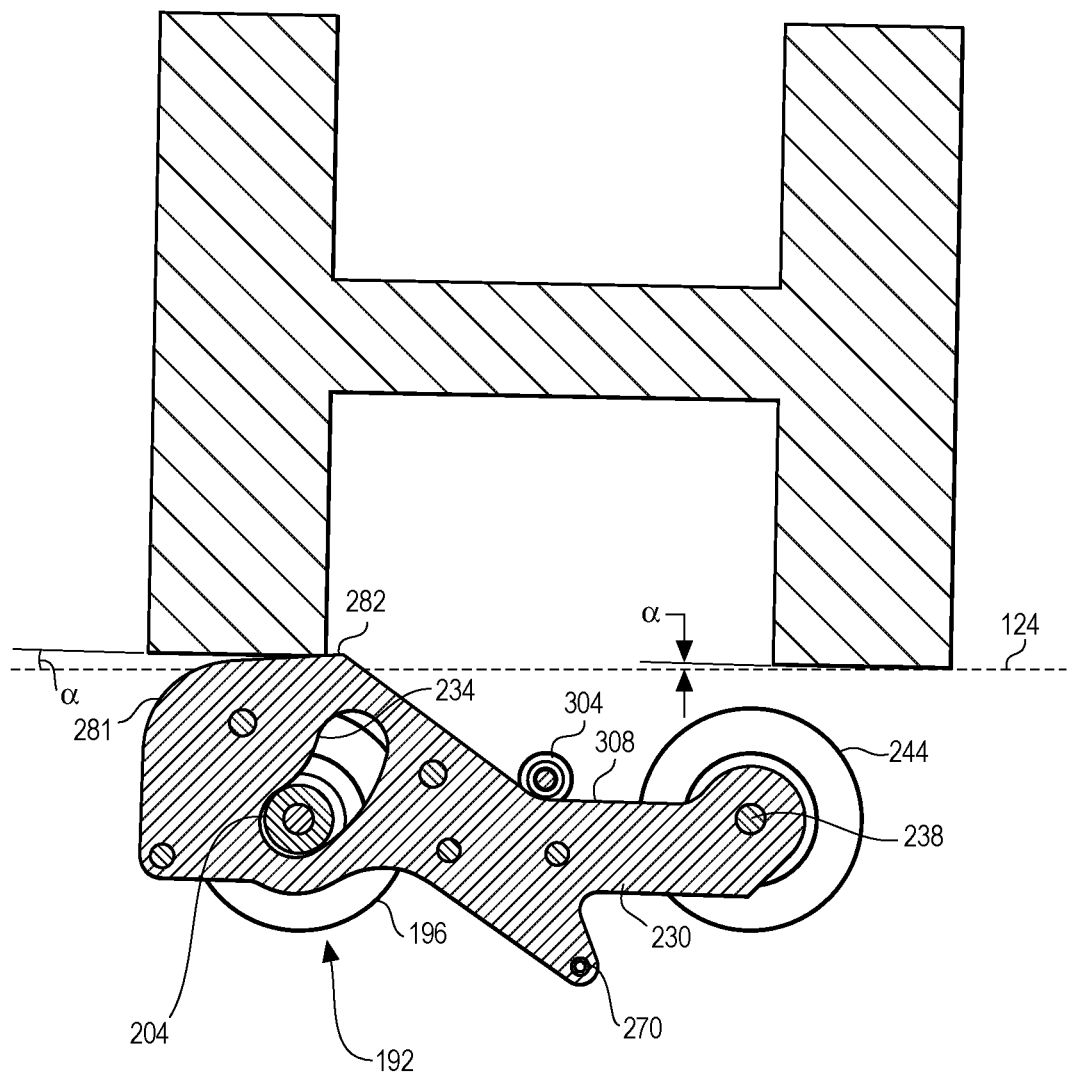
FIG. 17B is a cross-sectional view of the carriage assembly similar to in FIG. 17A, but FIG. 17B shows one of the lift members of the carriage assembly in a raised position and lifting a forward portion of the beam.

With reference to FIGS. 9 and 10, each lift member 230 has a small, spring pin aperture 268 for receiving a spring pin 270 (FIGS. 9 and 17B). The spring pin 270 functions to protect both the chain 150 (FIG. 17B) and the carriage assembly 128 from potentially damaging contact or interference during operation of the carriage assembly 128. Each lift member 230 further has a pair of switch assembly support holes or apertures 274 for retaining a switch or sensor assembly 280 (FIGS. 9 and 15B), the function of which will be discussed in detail below.

As can be seen in FIGS. 17A and 17B, each lift member 230 has a curved leading surface 281 extending to a beam lift surface 282, the function of which will be discussed in detail hereinafter.

Referring now to FIG. 10, each lift member 230 has a pivot aperture 284 for accommodating a shaft or pin 288 (FIG. 7), which in turn fits within a pivot aperture 286 (FIG. 10) of a dog or push member 292.

Figure 16B:
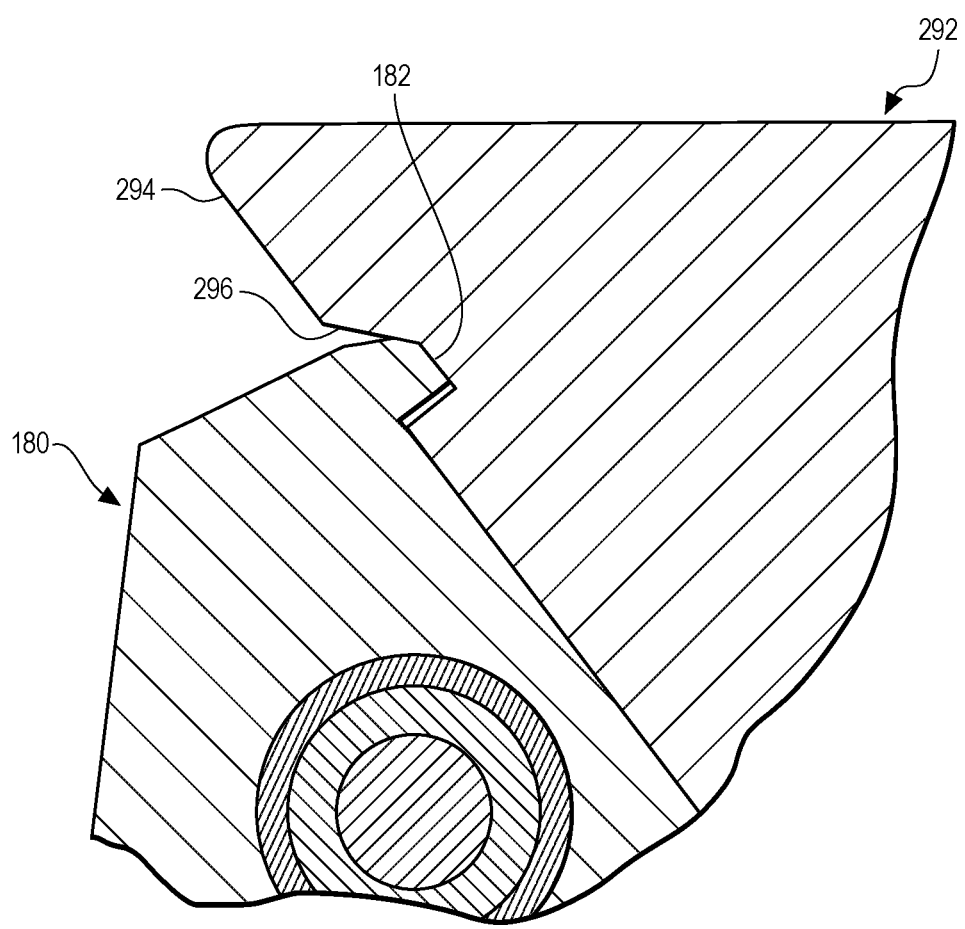
FIG. 16B is an enlarged cross-sectional view of a portion of the carriage assembly shown enclosed in the circled area in FIG. 16A.
Figure 16C:
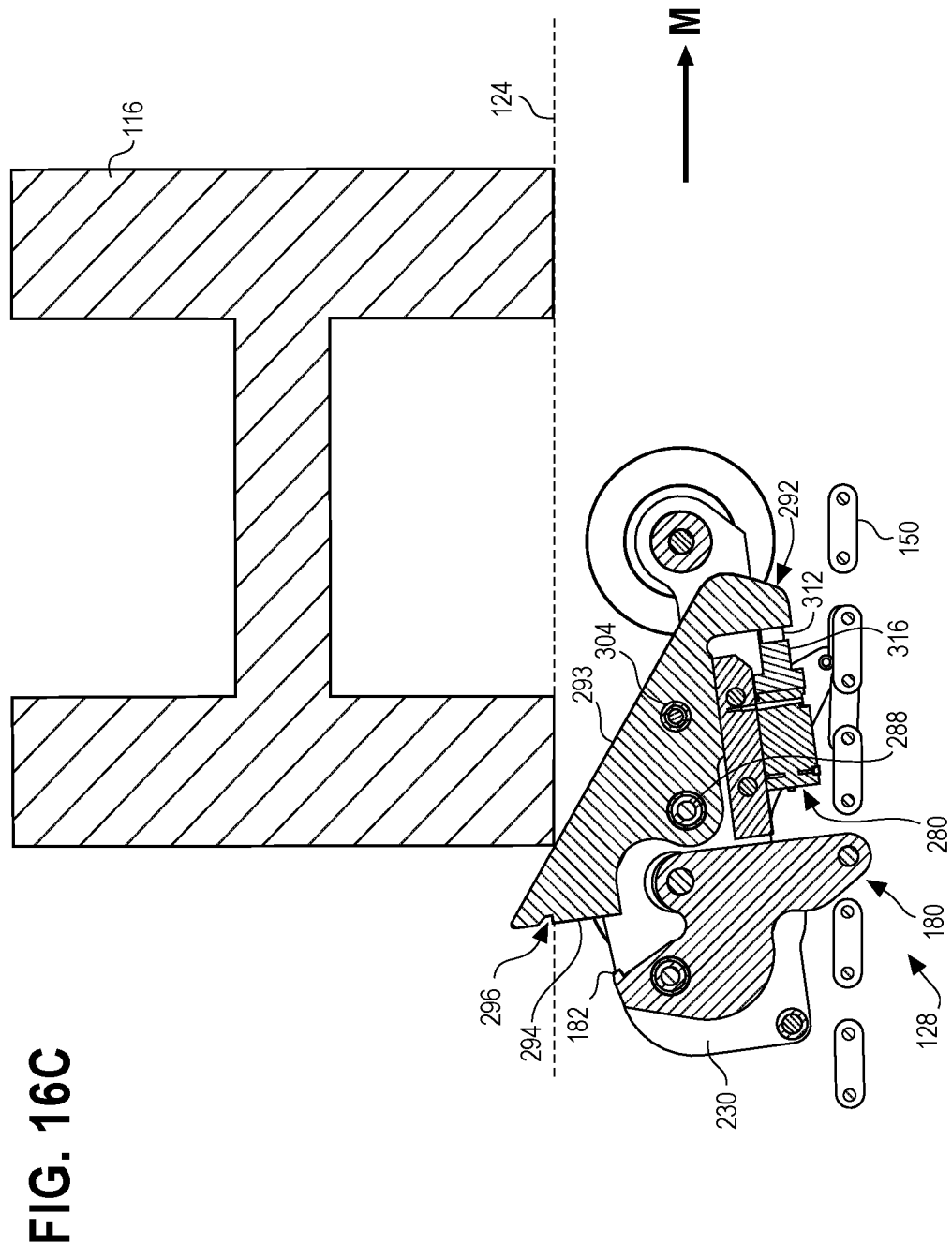
FIG. 16C is a cross-sectional view taken generally along the plane 16C-16C in FIG. 8.
Figure 16D:
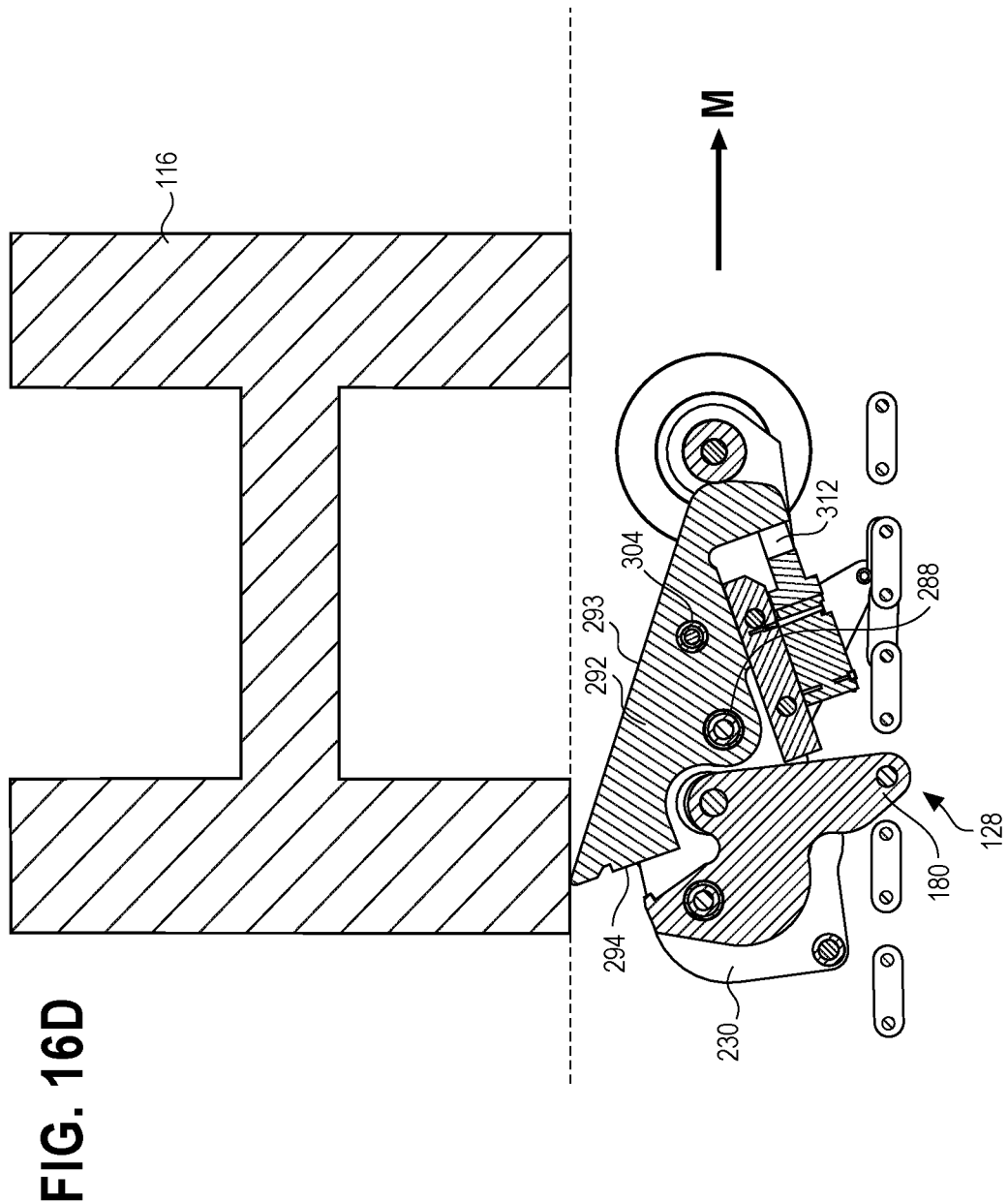
FIG. 16D is a cross-sectional view, taken generally along a vertical plane running through the center of the carriage assembly shown in FIG. 15C.

As can be seen in FIGS. 16A and 16D, the push member 292 is rotatable about the shaft 288 in a first direction into a "lowered position" with respect to the transfer stand support surface 124 such that the carriage assembly 128 is able to move beneath a beam 116 as the carriage assembly 128 moves along the transfer stand channel 138 (FIG. 18).

Figure 16G:
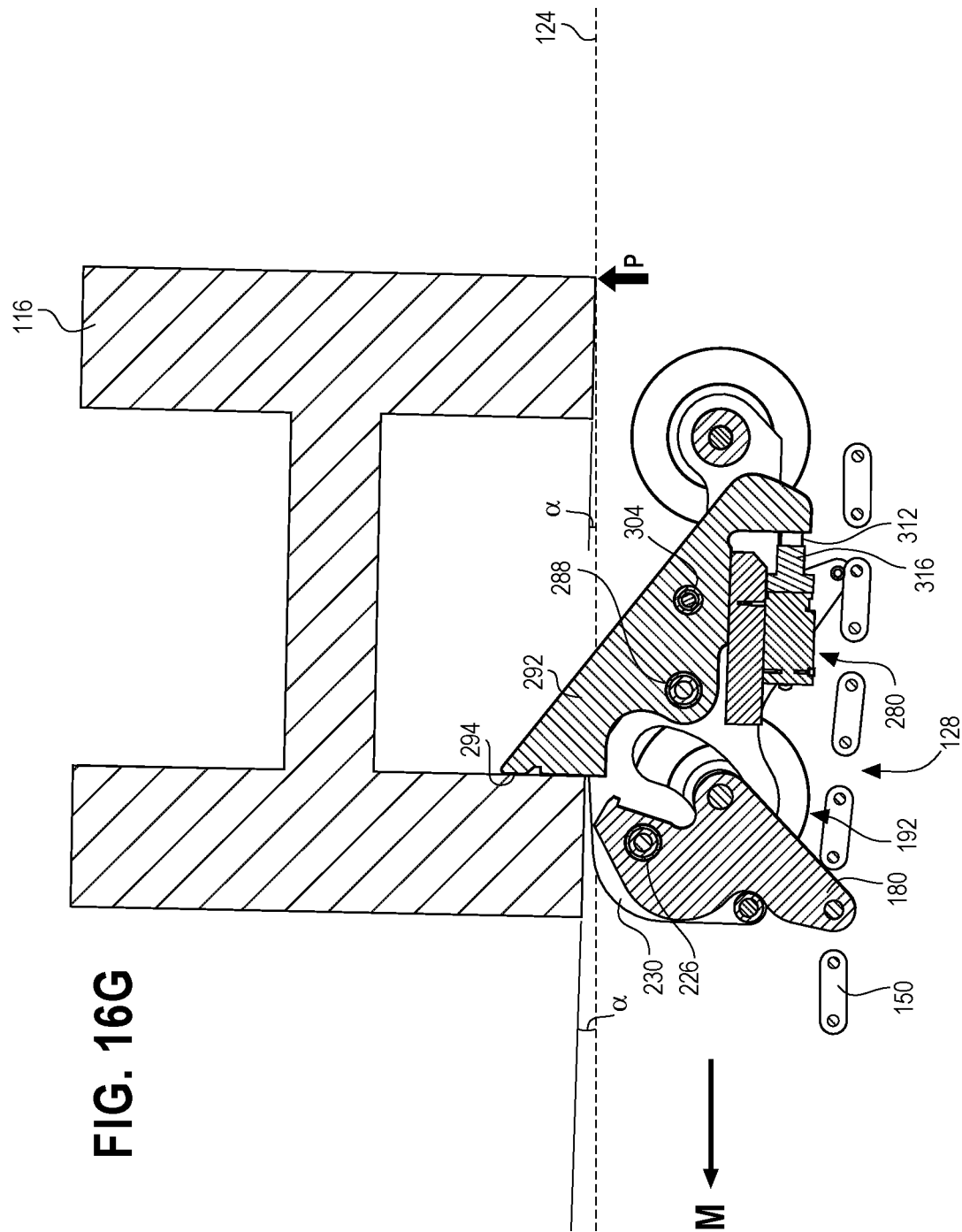
FIG. 16G is a cross-sectional view, taken generally t along a vertical plane running through the center of the carriage assembly shown in FIG. 15E.

Referring to FIGS. 16F and 16G, the push member 292 is further rotatable about the shaft 288 in a second (opposite) direction into a "raised position" with respect to the transfer stand support surface 124 such that the push member 292 is able to contact and push a beam 116 as the carriage assembly 128 moves along the transfer stand channel 138 (FIG. 18). The location of the center of mass of the push member 292 and the location of the shaft 288 enables gravity to rotate the push member 292 from the lowered position into the raised position when the push member 292 is not in contact with a beam 116.

As best shown in FIGS. 16C and 16D, the push member 292 has a generally flat, back surface 293 for being contacted by a beam 116 to rotate the push member 292 into a lowered position, such that the back surface 293 may slide beneath a portion of the beam 116 when the carriage assembly is moving in the rearward direction indicated by the arrow M in FIGS. 16C and 16D. The push member 292 further has a contact or push surface 294 (FIGS. 16G and 16F) for pushing a portion of the beam 116 when the carriage assembly is moving in the forward direction indicated by the arrow M in FIG. 16C. A channel or recess 296 (FIGS. 10 and 16B) is located on the contact surface 294 for receiving the aforementioned projection 182 (FIG. 16B) of the drive member 180 (FIG. 16B). The mating or accommodation of the projection 182 within the recess 296 functions to retain the push member 292 in the lowered position, to assist the push member 292 to pass beneath one or more beams 116 when the carriage assembly 128 moves in the forward direction (FIG. 16A), as will be discussed in detail hereinafter. It will be appreciated that in alternative configurations (not illustrated), a recess may be provided on the drive member and a projection may be provided on the engagement member. Furthermore, in some alternate design configurations of the carriage assembly, no projection or recess need be provided to maintain the push member in the lowered position.

Figure 8:
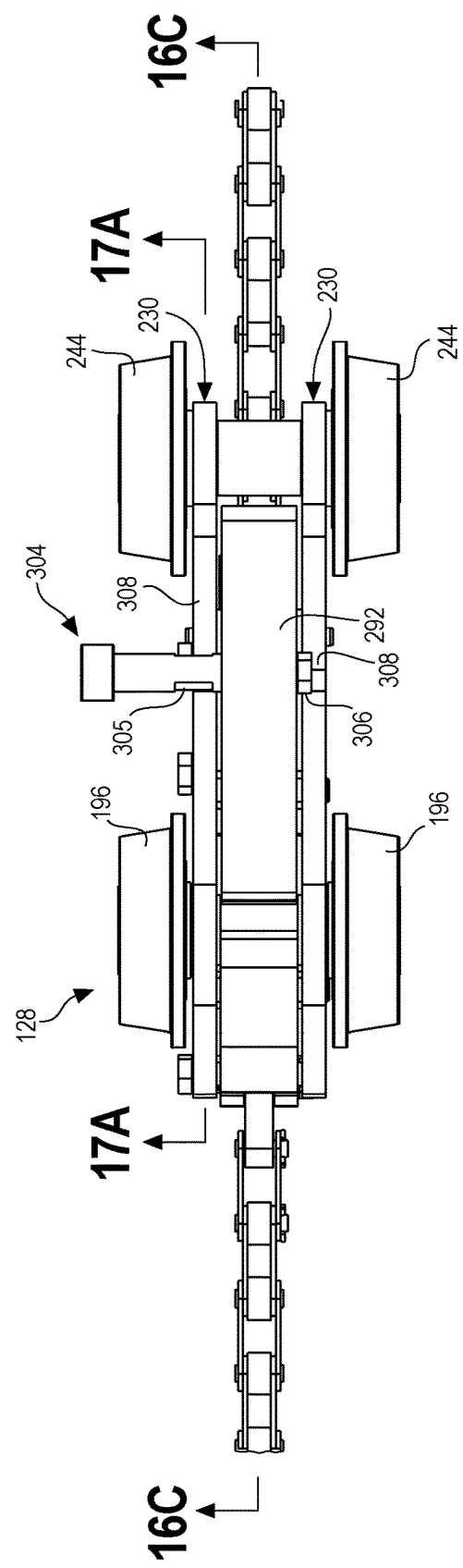
FIG. 8 is a top plan view of the carriage assembly shown in FIG. 7.

Referring to FIGS. 8 and 10, the push member 292 has a stop aperture 300 (visible in FIG. 10) for accommodating an outrigger, shaft, or stop member 304 (visible in FIG. 8). When the push member 292 rotates in the direction from the lowered position toward the raised position, portions 305, 306 of the stop member 304 (visible in FIG. 8) abut a top surface 308 of each lift member 230 (visible in FIGS. 7, 8, and 15B) to limit or stop the rotation of the push member 292 about shaft 288 (FIG. 7). Operation of the push member 292 will be further discussed in detail below.

Figure 15A:
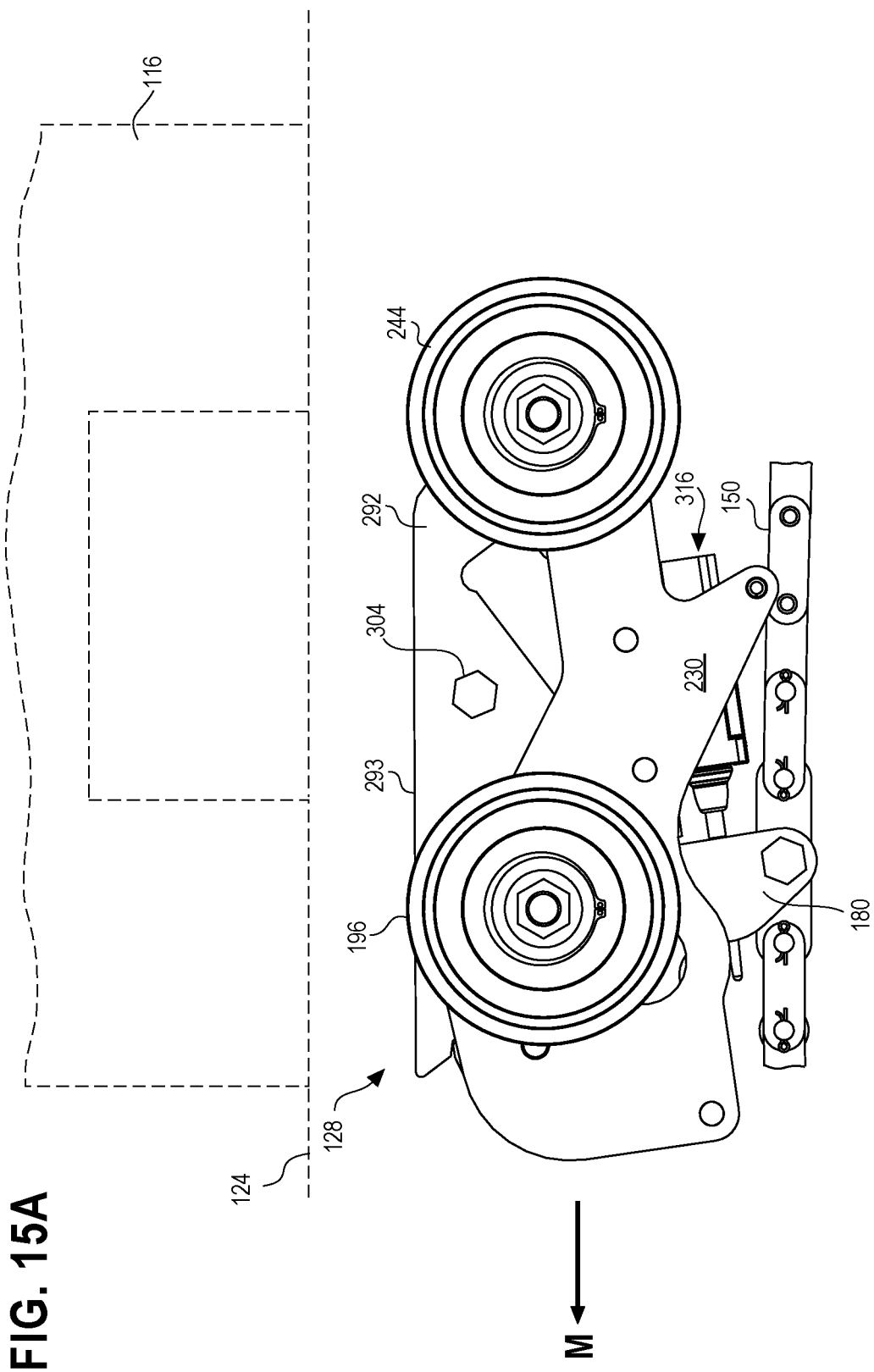
FIG. 15A is a right side elevation view similar to the carriage assembly shown in FIG. 7.
Figure 15B:
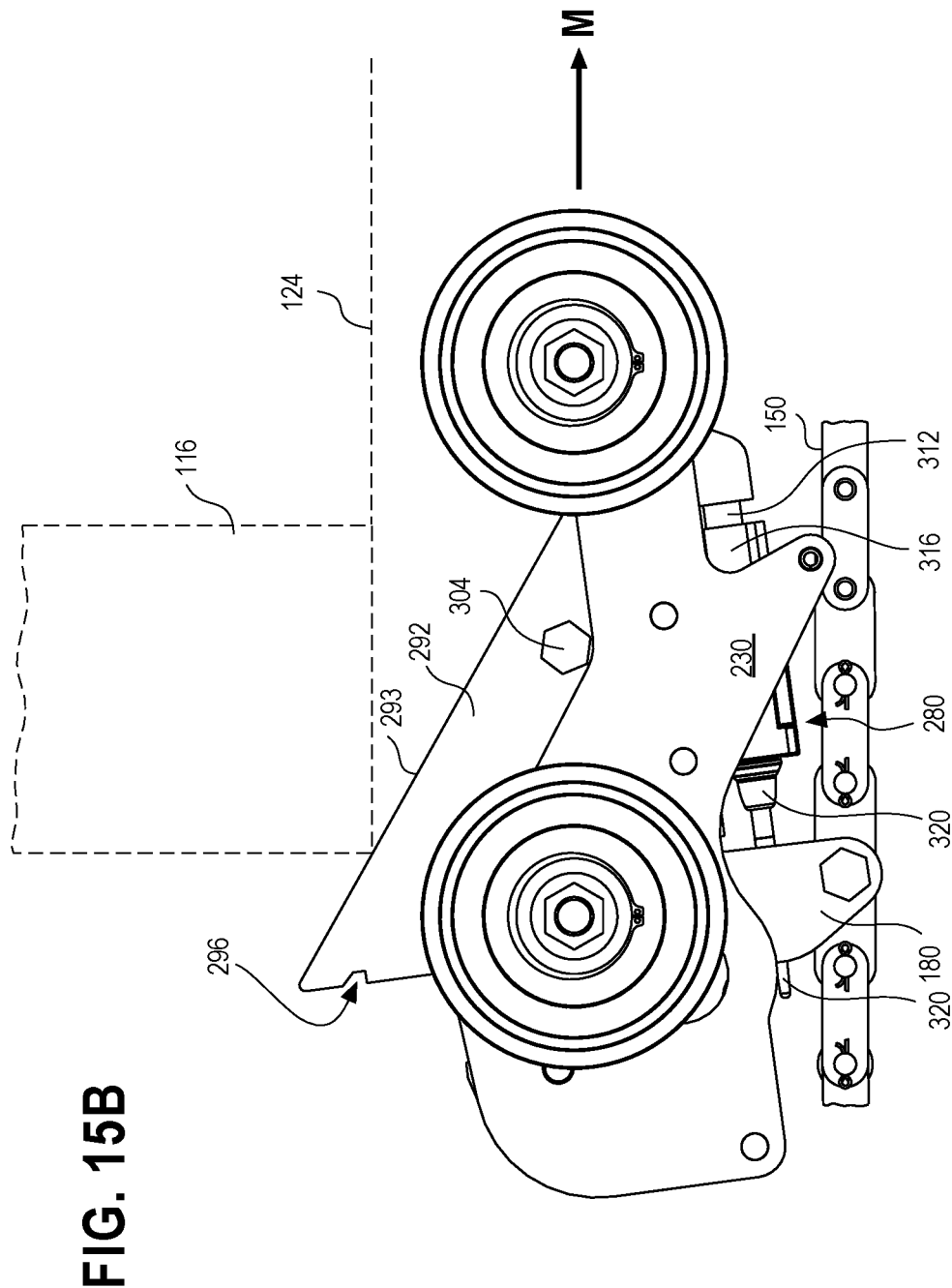
FIG. 15B is another right side elevation view similar to FIG. 15A.

With reference to FIGS. 15B and 16A, the push member 292 is further provided with a switch member 312 extending therefrom configured for opening and closing or otherwise changing the state of a sensor or switch 316 that is part of the aforementioned switch assembly 280. The switch 316 is preferably a wireless switch model WLS1A11BQRS2 manufactured by Honeywell and has an antenna 320 (visible in FIG. 15B) for wirelessly communicating the change of state of the switch 316 to a computer or programmable logic controller (hereinafter "PLC") or a manual operator of the transfer stand 104 (FIG. 2). Specifically, when the push member 292 is rotated into the lowered position (FIG. 16A), then the switch member 312 is rotated away from the switch 316 to allow the switch to be self-biased into an open state. When the push member 292 is rotated into the raised position (FIG. 16C) by gravity, then the switch member 312 is rotated into contact with/or adjacent to the switch 316 to place the switch 316 into a closed state. The changing states of the switch 316 inform the PLC or the operator that the push member 292 has made contact with the beam 116, and that the push member 292 is in the raised position for subsequently pushing or otherwise engaging the beam 116, as will be discussed hereinafter.

The general principles of the operation of the carriage assembly 128 in transporting a beam 116 to a transfer location will now be discussed with reference to FIGS. 16F and 16G. In the initial phase of the operation, the function of the carriage assembly 128 is to be pulled by the chain 150 until the push member 292 is confronting a front portion of the beam 116 (FIG. 16F). Thereafter, continued application of force on the chain 150 causes movement of the drive member 180, lift members 230, and the push member 292 such that a forward or leading portion of the beam 116 is lifted off of the support surface 124. As shown in FIG. 16G, some remaining or rearward portion of the beam 116 remains in contact with the support surface 124. The load or weight of the lifted portion of the beam 116 is distributed through each of the lift members 230, into the drive member 180, and ultimately into the wheels 196/244 (FIGS. 17A and 17B). The carriage 128 is constrained to generally linear movement along axis A by the location of the wheels 196/244 within the elongate channels 138 (FIGS. 18 and 19). With the lifted forward portion of the beam 116 supported by the lift members 230, the carriage assembly 128 is driven, by the chain 150, against the beam 116 to push against the lifted portion of the beam 116 to move the beam 116 with the rearward portion of the beam 116 dragging along the support surface 124.

The inventor has found that lifting some portion of the beam 116 and distributing the weight of that lifted portion of the beam through the low-friction rolling contact of the wheels 196/244 within the channels 138 (FIGS. 18 and 19), may have several advantages over prior art transfer stands. Such advantages can include the following: (i) reducing the amount of force required to move the beam along the transfer stand 104 by decreasing the amount of beam surface area that is in contact with, or dragging along, the support surface 124; (ii) reducing the wear on the support surface 124 due to a lowered dragging force on the support surface 124; and/or (iii) reducing the size of the motor, and energy, required to drive the chain 150 and carriage assembly 128 to move the beam 116.

Furthermore, the inventor has found that the configuration of the carriage assembly 128 and transfer stand 104 disclosed herein is particularly "sensitive" and "durable", and is well-suited for handling a wide range of workpieces ranging from lightweight workpieces (less than about 1,100 kg/m) to heavy workpieces (more than 1,100 kg/m). The term "sensitive" as used herein, refers to the ability of the push member 292 to be rotated into the raised position, to close the switch member 312, as a result of contact with a lightweight workpiece or beam. The term "durable" as used herein, refers to the ability of the push member 292 to withstand the forces resulting from initial contact and pushing of a heavy workpiece or beam.

In addition, the relatively compact size of the carriage assembly 128 allows beams 116 to be placed relatively closely on the transfer stand 104. Close arrangement of the beams 116 on the transfer stand 104 enables the operator to place more beams 116 on the transfer stand 116 at a given time. Prior art transfer stands have larger mechanisms for moving the beams, which in turn undesirably increases the minimum spacing between beams that is achievable in the prior art.

Operation of the Transfer Stands

Referring to FIG. 1, the operation of the carriage assembly 128 will now be discussed in greater detail with respect to one of the transfer stands 104 located in the loading station L at the inlet side of the processing machine 112, and the transfer stand 104 is located adjacent to the conveyor 108 for transferring a beam 116 from the transfer stand 104 onto the conveyor 108. A plurality of transfer tables 104 may be loaded with one or more beams 116, such as by a forklift. The direction of movement of the carriage assembly 128 is indicated throughout the relevant, accompanying drawings by the arrow adjacent the letter "M".

Referring to FIG. 11, prior to loading of the beam 116 (not visible in FIG. 11) atop the transfer table 104 by a forklift, the movable support surfaces 154 are moved into the actuated or raised position by the actuator 162 driving the linkage 158 such that the movable support surfaces 154 are raised above the rollers 166. Once the weight of the beam 116 is supported by the movable support surfaces 154, then the movable support surfaces 154 are lowered into the unactuated or lowered position by reversing the linkage 158 such that the movable support surfaces 154 are located beneath the top surface of the rollers 166 (as shown in FIG. 11). Loading a beam 116 onto the rollers 166 in this manner prevents the accumulation of thrust forces that may damage the rollers 166 if they were to be loaded directly by a forklift (e.g., the beam dragging against the top surface of the rollers 166 in the direction of the axis or shaft of the rollers 166).

We assume that the carriage assembly 128 is initially located rearwardly of the beam 116 that is to be moved (i.e., the beam 116 is located between the conveyor 108 and the carriage assembly 128 as shown at the loading station L in FIG. 1). Then the operator of the transfer stand 104, be it a person or an automated system such as a PLC, must place the push member 292 in a lowered position sufficient to allow the push member 292 to move forward toward the conveyor 108 and pass beneath the beam 116 as shown in FIGS. 15A and 16A, and ultimately to locate it just forwardly of the beam 116 as explained below. To lower the push member 292 sufficiently, the cam actuator 175 (FIG. 13) is actuated to drive the cam 176 along the surface 177. Referring to FIG. 14, an elongate portion of the linkage that comprises the cam 176 contacts and lifts the carriage assembly stop member 304 (which, in FIG. 8, can be seen to project outwardly from the push member 292). The stop member 304 is lifted by the cam 176 sufficiently to rotate the push member 292 to allow the engagement of the tooth 182 (FIG. 16B) and the recess 296 (FIG. 16B).

Referring to FIG. 16A, if the switch 316 is being utilized by the operator, then the rotation of the push member 292 into the lowered position by the cam 176 (FIG. 14) causes the switch member 312 to move away from the switch 316 to change the state of the switch 316 (compare FIG. 16A with FIG. 16C or FIG. 15A with FIG. 15B). With the tooth 182 (FIG. 16B) engaged within the recess 296 (FIG. 16B), and the state of the switch 316 opened, the operator actuates the drive motor 146 (FIG. 4) to move the chain 150 so as to pull the carriage assembly 128 beneath the beam 116 to a predetermined location that is forward of the beam 116.

Referring next to FIGS. 15B and 16C, once the carriage assembly 128 is pulled by the chain 150 to a predetermined position that is located forwardly of the beam 116 to be moved, then the drive motor 146 (FIG. 4) is stopped by the operator. Due to the shape of the tooth 182 (visible in FIG. 16C) and the recess 296, and due to gravity acting on the pivotally mounted push member 292, the push member 292 pivots into the raised position shown in FIGS. 15B and 16C. The stop member 304 prevents the push member 292 from rotating any further under its own weight about the shaft 288 (visible in FIG. 16C) even if the carriage assembly was so far forward of the beam 116 so that the beam 116 could not interfere with the push member 292. Rotation of the push member 292 into the raised position causes the switch member 312 to move toward the switch 316 to change the state of the switch 316 to the closed state.

Still referring to FIGS. 15B and 16C, with the state of the switch 316 in the closed state, the operator then drives the carriage assembly 128 rearwardly (in the direction of arrow M) such that the rear surface 293 of the push member 292 contacts the forward portion of the beam 116.

Referring to FIGS. 15C and 16D, the continued rearward driving of the carriage assembly 128 causes rotation of the push member 292 into the lowered position such that the push member 292 is able to slide beneath the bottom of the forward portion of the beam 116. Movement of the push member 292 into the lowered position by contact with the beam 116 causes the switch member 312 to move away from the switch 316 to change the state of the switch 316 back to the open state.

Referring to FIG. 16E, once the push member 292 has moved passed the leading portion of the beam 116 then the push member 292 rotates on shaft 288 back into the raised position due to gravity, because the stop member 304 abuts a top surface 308 (FIG. 7) of each lift member 230 (FIG. 7) to limit or stop the rotation of the push member 292 about shaft 288. The stop member 304 prevents the push member 292 from rotating any further due to gravity. Rotation of the push member 292 into the raised position causes the switch member 312 to move toward the switch 316 to change the state of the switch 316 back into a closed state and that signals the operator to stop the chain drive motor 146 from driving the carriage assembly 128 any further rearwardly.

Figure 15D:
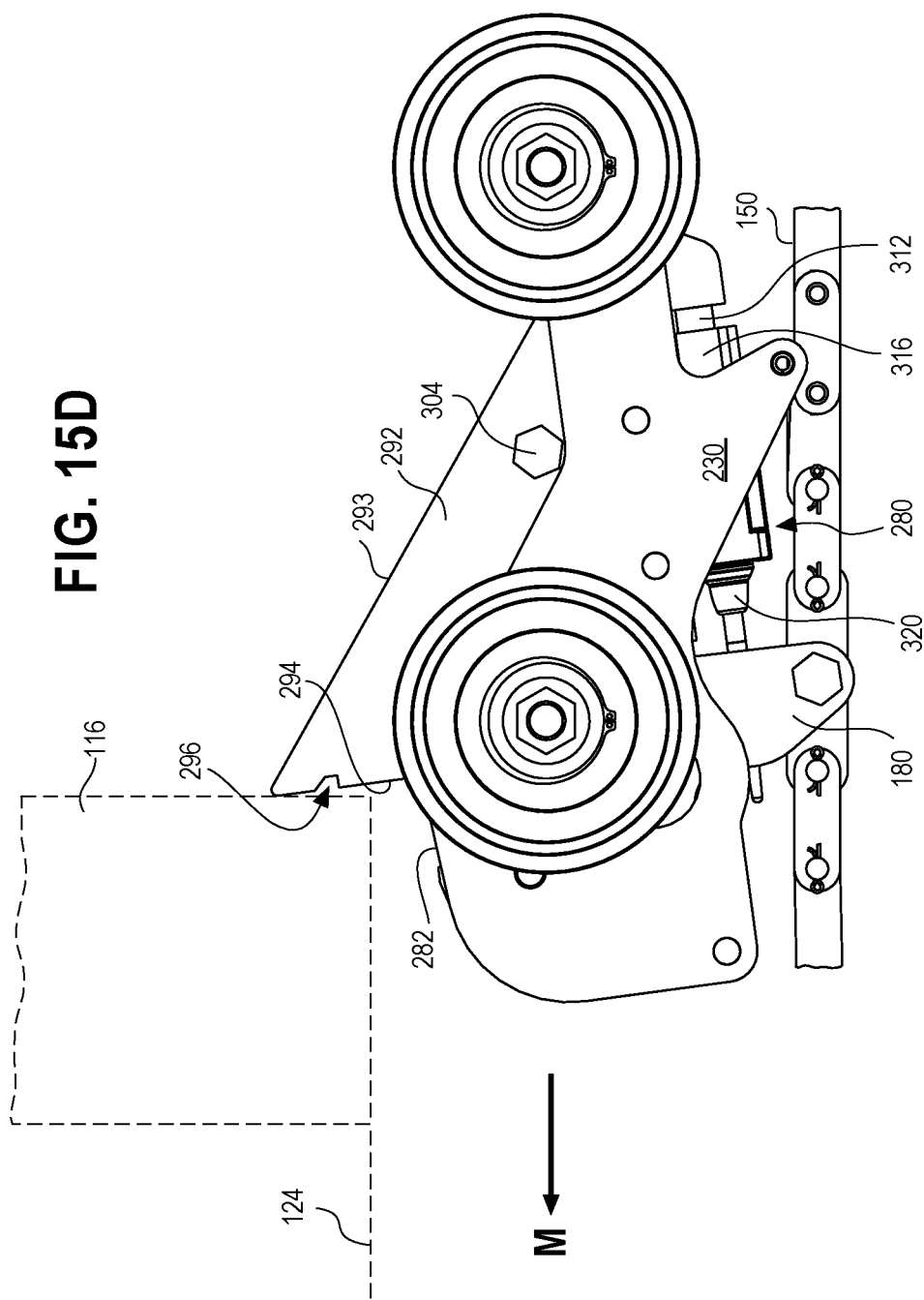
FIG. 15D is another right side elevation view similar to FIG. 15A.

Referring to FIGS. 15D and 16F, the operator can then actuate the chain drive motor 146 to drive the carriage assembly 128 forwardly (in the direction of arrow M) such that the front surface 294 of the push member 292 contacts the leading portion of the beam 116.

Referring next to FIG. 16G, the continued forward driving of the carriage assembly 128 (in the direction of arrow M) causes a rotation of the drive member 180 about the shaft 226 such that the lift plates 230 are lifted with respect to the front wheel assembly 192 from a lowered position to a raised position above the support surface 124 so as to lift the forward portion of the beam 116.

More specifically with reference to FIGS. 17A and 17B, the drive member 180 (FIG. 16G) rotates under the tension force of the chain 150 and the drive member 180 moves with respect to the elongate channels 234 within each lift plate 230. The elongate channels 234 accommodate the pivoting movement of the lift plate 230 relative to the axle 204 (which remain at a fixed elevation owing to the wheels 196 being vertically retained within the channels 138 as seen in FIG. 19). The tension force exerted by the chain 150 and the rotation of the drive member 180 is sufficient to lift the weight of the front portion of the beam 116 with the lift surfaces 282 of the lift plates 230.

Referring to FIGS. 16G and 17B, the inventor has found that it is preferable if the front portion of the beam 116 is lifted less than about 6 cm above the support surface 124, and the angle α at which the beam 116 is lifted is minimized to reduce the amount of weight carried by the trailing edge of the rear portion of the beam 116 that remains on the support surface 124. Preferably, the rear portion or edge of the beam 116 that remains on the support surface 124 makes substantially line contact with the support surface 124 (denoted by location P in FIG. 16G).

Referring to FIG. 18, the operator continues to drive the chain 150 to move the entire beam 116 forwardly along the axis "A" toward the end plate 174 with: (i) the front portion of the beam 116 lifted and supported by the wheels 196 and 244 (visible in FIG. 17B) within the channel 138; and (ii) the rear portion of the beam 116 (visible in FIG. 17B) dragging or sliding along the support surface 124. The beam 116 is transported in this manner toward the pair of movable support surfaces 154 that are located proximal the end plate 174. Prior to transporting the beam 116 onto the support surfaces 154, the linkage 158 (FIG. 12) is actuated to raise the movable support surfaces 154 (FIG. 12). The beam 116 is then transported by the carriage assembly 128 onto the movable support surfaces 154. With the beam 116 located atop the movable support surfaces 154, the movable support surfaces 154 are lowered such that the beam 116 is left resting only on the conveyor 108 (FIG. 1). The movable support surfaces help to prevent or at least reduce potentially destructive thrust forces that would otherwise develop by dragging the beam 116 directly onto any rollers of the conveyor 108.

After the aforementioned first beam 116 has been transferred onto the conveyor 108 (FIG. 1), the carriage assembly 128 may be driven rearwardly (such as is in the direction of the arrow M shown in FIG. 15B) by the operator actuating the chain drive motor so that such that the push member 292 engages and subsequently moves a second beam 116. The second and subsequent beams 116 may be moved in the same manner as discussed above with respect to the first beam 116.

It will be understood that the above description of the operation of a single transfer stand 104 will apply a plurality of transfer stands that are being operated simultaneously with the transfer stand 104 above in order to move the beam 116 evenly onto the conveyor 108. It will further be understood that the operation of the transfer stand 104 would be essentially identical if the transfer stand 104 were to be located on the outlet side of the machining process 112 for transferring beams 116 away from the conveyor 108.

In alternate embodiments of the inventive transfer stand (not illustrated), the push member need not be configured to move below the beam, and instead may be positioned so as to pass above or beside the beam as the carriage travels along the axis "A". In addition, the lift members may be configured to pull the beam upwards instead of push the beam upwards. Furthermore, it will be appreciated that the inventive transfer stand need not employ the particular driven linkage or carriage assembly shown, and may instead be provided with a greater or fewer number of components depending on the need of the operator as determined by the size and weight of the workpieces to be moved. Further, any of the components of the carriage may be separately motorized or energized (such as the lift members and/or the push member) and need not be powered by movement of the drive chain.

The invention claimed is:

1. A transfer apparatus (104) for transferring a workpiece (116), said transfer apparatus (104) comprising:
  (A) at least one support surface (124) for supporting a workpiece (116);
  (B) a carriage (128) movable with respect to said at least one support surface (124) between a loading location and an unloading location;
  (C) a drive mechanism (146, 150) operatively connected to said carriage (128) for moving said carriage (128) between said loading location and said unloading location;
  said carriage (128) having
    (i) at least one lift member (230) moveable between a lowered position relative to said at least one support surface (124) and a raised position relative to said at least one support surface (124), and
    (ii) at least one push member (292) operatively connected with said at least one lift member (230) to enable engagement of a workpiece (116) with said at least one push member (292) and said at least one lift member (230) to lift a portion of the workpiece (116) from said at least one support surface (124) to decrease the frictional engagement between the workpiece (116) and said at least one support surface (124);
  wherein said carriage (128) further comprises a drive member (180) operatively connected with said drive mechanism (146, 150); and
  wherein
    (i) one of said drive member (180) and said at least one push member (292) has a projection (182), and
    (ii) the other of said drive member (180) and said at least one push member (292) has a recess (296), whereby cooperation of said projection (182) with said recess (296) inhibits relative rotation between said at least one push member (292) and said drive member (180).

2. A transfer apparatus (104) for transferring a workpiece (116), said transfer apparatus (104) comprising:
  (A) at least one support surface (124) for supporting a workpiece (116);
  (B) a carriage (128) movable with respect to said at least one support surface (124) between a loading location and an unloading location;
  (C) a drive mechanism (146, 150) operatively connected to said carriage (128) for moving said carriage (128) between said loading location and said unloading location;
  said carriage (128) having
    (i) at least one lift member (230) moveable between a lowered position relative to said at least one support surface (124) and a raised position relative to said at least one support surface (124), and
    (ii) at least one push member (292) operatively connected with said at least one lift member (230) to enable engagement of a workpiece (116) with said at least one push member (292) and said at least one lift member (230) to lift a portion of the work ice (116) from said at least one support surface (124) to decrease the frictional engagement between the workpiece (116) and said at least one support surface (124); and
  wherein said at least one push member (292) is rotatably connected with said at least one lift member (230) such that (i) in a first rotated position said at least one push member (292) is located below said support surface (124), and (ii) in a second rotated position some portion of said push member (292) is located above said support surface (124).

3. The transfer apparatus (104) of claim 2 wherein said carriage (128) further comprises a stop member (304) arranged on said carriage (128) to limit the relative rotation between said at least one push member (292) and said at least one lift member (230).

4. The transfer apparatus (104) of claim 2 wherein said carriage (128) further comprises a switch (316) having at least a first and second state, wherein rotation of said push member (292) between said first rotated position and said second rotated position changes the state of said switch (316).

5. A method of transferring a workpiece (116) with a transfer apparatus (104), said method comprising the steps of:
  (A) obtaining a transfer apparatus (104) for transferring a workpiece (116), said transfer apparatus (104) comprising:
    (a) at least one support surface (124) for supporting a workpiece (116);
    (b) a carriage (128) movable with respect to said at least one support surface (124) between a loading location and an unloading location;
    (c) a drive mechanism (146, 150) operatively connected to said carriage (128) for moving said carriage (128) between said loading location and said unloading location; said carriage (128) having
      (i) at least one lift member (230) moveable between a lowered position relative to said at least one support surface (124) and a raised position relative to said at least one support surface (124), and
      (ii) at least one push member (292) operatively connected with said at least one lift member (230) to enable engagement of a workpiece (116) with said at least one push member (292) and said at least one lift member (230) to lift a portion of the workpiece (116) from said at least one support surface (124) to decrease the frictional engagement between the workpiece (116) and said at least one support surface (124);
  (B) loading at least a first workpiece (116) onto said transfer apparatus (104);
  (C) moving said carriage (128) in a first direction with said drive mechanism (146, 150) such that said at least one push member (292) engages the first workpiece (116);
  (D) moving said at least one lift member (230) into said raised position above said at least one support surface (124) to lift a first portion of the first workpiece (116) from said at least one support surface (124);
  (E) moving said carriage (128) in said first direction whereby said first portion of the first workpiece (116) is carried by said lift member (230) as the first workpiece (116) is pushed by said push member (292) whereby a second portion of the first workpiece (116) slides on said at least one support surface (124);
  (F) lowering said first portion of the first workpiece (116) onto said at least one support surface (124); and
  (G) moving said carriage (128) in a second direction opposite to said first direction whereby said at least one push member (292) contacts a second workpiece (116) to rotate said push member (292) to slide under the second workpiece (116).

* * * * *

UNITED STATES PATENT AND TRADEMARK OFFICE
CERTIFICATE OF CORRECTION

PATENT NO. : 10,207,309 B2
APPLICATION NO. : 15/776711
DATED : February 19, 2019
INVENTOR(S) : James Magnuson It is certified that error appears in the above-identified patent and that said Letters Patent is hereby corrected as shown below:

In the Claims

Claim 2, (Column 14, Line 60), delete the words "work ice" and substitute the word "workpiece" therefor.

Signed and Sealed this
Fourth Day of June, 2019

Andrei Iancu
*Director of the United States Patent and Trademark Office*